(12) United States Patent
Brunswick et al.

(10) Patent No.: US 6,991,363 B2
(45) Date of Patent: *Jan. 31, 2006

(54) MIXER WITH PIVOTABLE BOWL

(75) Inventors: Brian A. Brunswick, Troy, OH (US);
Joseph C. Huang, Dayton, OH (US);
Brian E. Bader, Springfield, OH (US)

(73) Assignee: Premark FEG L.L.C., Wilmington, DE (US)

(*) Notice: Subject to any disclaimer, the term of this patent is extended or adjusted under 35 U.S.C. 154(b) by 133 days.

This patent is subject to a terminal disclaimer.

(21) Appl. No.: 10/039,930

(22) Filed: Oct. 27, 2001

(65) Prior Publication Data

US 2002/0093877 A1 Jul. 18, 2002

Related U.S. Application Data

(63) Continuation-in-part of application No. 09/561,828, filed on Apr. 28, 2000, now Pat. No. 6,494,610.

(51) Int. Cl.
*B01F 7/16* (2006.01)
*B01F 15/00* (2006.01)

(52) U.S. Cl. .................. 366/203; 366/206; 366/207
(58) Field of Classification Search ............ 366/96–98, 366/189, 197–199, 203, 206, 207, 220, 288; 220/735–736, 741, 742, 751, 480–481, 475, 220/770, 756, 759, 758, 773; 16/425
See application file for complete search history.

(56) References Cited

U.S. PATENT DOCUMENTS

| 32,482 A | 6/1861 | Lane |
| 140,527 A | * 7/1873 | Munson, Jr. ............ 220/758 |
| 227,239 A | 5/1880 | Frentress |
| 320,255 A | 6/1885 | Jackman |
| 613,888 A | * 11/1898 | Schmuck .............. 220/814 |
| 735,353 A | 8/1903 | Eifert |
| 760,693 A | 5/1904 | Lancaster et al. |
| 826,223 A | 7/1906 | Broadwell |
| 879,590 A | 2/1908 | Roth |
| 910,648 A | * 1/1909 | Davison ............... 220/759 |
| 1,143,484 A | * 6/1915 | Beach ................ 220/759 |
| 1,264,128 A | 4/1918 | Rataiczak |
| 1,366,114 A | 1/1921 | Boggs |
| 1,415,735 A | 5/1922 | Trust et al. |
| 1,428,704 A | 9/1922 | Petri |
| 1,468,615 A | 9/1923 | Guttenstein et al. |

(Continued)

FOREIGN PATENT DOCUMENTS

DE 1070563 12/1959

(Continued)

OTHER PUBLICATIONS

Service Manual, *Models H–600 and H–600–T and L–800 Mixers,* Hobart Corporation (Jul. 1977).
Instructions Manual, *H600 & L800 Mixers,* Hobart Corporation (Dec. 1999).

(Continued)

*Primary Examiner*—Charles E. Cooley
(74) *Attorney, Agent, or Firm*—Thompson Hine LLP

(57) ABSTRACT

A pivotable mixer bowl including a bowl body for receiving material to be mixed, a first mounting bracket coupled to and extending from an outer surface of the bowl body and having an opening therein, and a second mounting bracket coupled to and extending from the outer surface and having an opening therein. The second mounting bracket is vertically spaced from the first mounting bracket. The opening of the second mounting bracket is generally aligned with the opening of the first mounting bracket to define a pivot axis of the mixer bowl. The mixer bowl further includes a locking bracket coupled to and extending from an outer surface of the bowl body.

36 Claims, 20 Drawing Sheets

U.S. PATENT DOCUMENTS

| | | | |
|---|---|---|---|
| 1,548,041 A | | 8/1925 | Johnston et al. |
| 1,548,919 A | | 8/1925 | Ward |
| 1,562,704 A | | 11/1925 | Kevan |
| 1,634,777 A | * | 7/1927 | Girdler ............... 220/480 |
| 1,695,345 A | | 12/1928 | Read |
| 1,733,945 A | | 10/1929 | Dehuff |
| 1,743,271 A | | 1/1930 | Gould |
| 1,761,237 A | | 6/1930 | Schiff |
| 1,767,002 A | | 6/1930 | Johnston et al. |
| 1,774,509 A | | 9/1930 | Gould |
| 1,781,321 A | | 11/1930 | Dehuff |
| 1,807,589 A | * | 6/1931 | Edmunds ............. 220/475 |
| 2,024,282 A | | 12/1935 | Geiger |
| 2,122,628 A | * | 7/1938 | Tracy ................. 220/740 |
| 2,181,079 A | | 11/1939 | Dehuff |
| 2,251,903 A | | 8/1941 | Anstice et al. |
| 2,613,847 A | * | 10/1952 | Lacher ................ 220/754 |
| 3,073,493 A | * | 1/1963 | Pfaffenberger ........ 220/741 |
| 3,075,746 A | | 1/1963 | Yablonski et al. |
| 3,255,913 A | * | 6/1966 | Helm ................. 220/475 |
| 3,533,603 A | | 10/1970 | Kovacs |
| 3,758,183 A | | 9/1973 | Steinkamp et al. |
| 4,042,221 A | | 8/1977 | Myers et al. |
| 4,135,828 A | * | 1/1979 | Cabak ................ 366/197 |
| 4,173,925 A | | 11/1979 | Leon |
| 4,283,148 A | | 8/1981 | Peterson |
| 4,402,466 A | | 9/1983 | Schmidt |
| 4,765,746 A | | 8/1988 | Suay Puig |
| 4,823,633 A | | 4/1989 | Pike |
| 4,854,711 A | * | 8/1989 | Hagan ................. 366/46 |
| 4,937,916 A | | 7/1990 | Redman |
| 4,946,285 A | | 8/1990 | Vennemeyer |
| 5,048,709 A | * | 9/1991 | Alverson ............. 220/709 |
| 5,123,747 A | * | 6/1992 | Derksen .............. 366/197 |
| 5,157,983 A | | 10/1992 | Sankovic |
| 5,306,083 A | | 4/1994 | Caldwell et al. |
| 5,325,980 A | * | 7/1994 | Grimm et al. ......... 220/212 |
| 5,325,982 A | * | 7/1994 | Cobb, Jr. ........... 220/212.5 |
| 5,409,149 A | | 4/1995 | Hough |
| 5,472,276 A | | 12/1995 | Ratermann et al. |
| 5,494,350 A | | 2/1996 | Childress |
| 5,653,535 A | | 8/1997 | Xie et al. |
| 5,690,427 A | | 11/1997 | Jennings |
| 5,806,704 A | * | 9/1998 | Jamison .............. 220/212 |
| 5,860,738 A | | 1/1999 | Brinkman |
| 5,934,802 A | | 8/1999 | Xie |
| 6,092,647 A | * | 7/2000 | Yeh et al. ............ 220/756 |
| 6,494,610 B1 | * | 12/2002 | Brunswick ............ 366/207 |
| 6,595,680 B2 | * | 7/2003 | Sanpei et al. ......... 366/147 |
| 6,883,959 B2 | | 4/2005 | Donthnier et al. |
| 2002/0093877 A1 | * | 7/2002 | Brunswick et al. ...... 366/206 |
| 2002/0181322 A1 | | 12/2002 | Brunswick et al. |
| 2004/0120213 A1 | * | 6/2004 | Short et al. |
| 2004/0120215 A1 | * | 6/2004 | Huang et al. |
| 2004/0120216 A1 | * | 6/2004 | Donthnier et al. |
| 2004/0208082 A1 | | 10/2004 | Huang et al. |
| 2005/0002272 A1 | | 1/2005 | Brunswick et al. |
| 2005/0141340 A1 | | 6/2005 | Donthnier et al. |

FOREIGN PATENT DOCUMENTS

| | | | |
|---|---|---|---|
| DE | 1298510 | | 7/1969 |
| EP | 1027920 | | 8/2000 |
| EP | 1151669 A2 | | 7/2001 |
| FR | 1079799 | | 5/1954 |
| FR | 2728485 | | 6/1996 |
| FR | 2740064 | | 4/1997 |
| FR | 2805177 | * | 8/2001 |
| GB | 120393 | | 3/1919 |
| GB | 672619 | | 5/1952 |
| JP | 11-347390 | * | 12/1999 |
| WO | WO 96/30114 | | 10/1996 |

OTHER PUBLICATIONS

*Varimixer Food Mixer Model W60* (2 pages), A Welbilt Company (Sep. 1996).
*100*
Gear Transmission Mixer (1 page); American Eagle Food Machinery, Inc. (date unknown).
*The Best Values Just Got Better* (3 pages), Univex (date unknown).
*Heavy Duty Dough Mixers* (3 pages), Spar Mixer (date unknown).
*EM20 Heavy Duty Professional 20 Quart Mixer* (1 page), Dito Dean Food Prep (date unknown).
The Hobart Manufacturing Company—Instruction Manual . . . with catalog of Replacement Parts—Hobart Models A–200 and A–200T Mixers—Feb. 1966—15 pages.

* cited by examiner

MIXER WITH PIVOTABLE BOWL

This application is a continuation-in-part of U.S. application Ser. No. 09/561,828, filed Apr. 28, 2000, now U.S. Pat. No. 6,494,610 B1, the contents of which are hereby incorporated by reference.

BACKGROUND OF THE INVENTION

The present invention is directed to a bowl that can be pivotally coupled to a mixer, and to a mixer system having a pivotable bowl.

Mixers are used to mix and blend a wide variety of materials. The mixers typically include a mixer body having a motor that drives a generally vertically-extending mixing element, and a bowl that is located below the mixing element. The bowl receives the materials to be mixed and the lower end of the rotatable mixing element therein. The bowl is typically detachable from the mixer body to aid in loading and unloading the materials into the bowl, and to enable cleaning, repair or replacement of the bowl.

In most existing mixers, the mixer bowl is vertically movable relative to the body such that the bowl can be lowered away from the mixing element. The materials to be mixed can then be added to or removed from the bowl while the bowl is in its lowered position. However, even after the bowl is lowered, the user may have difficulty in accessing the bowl to add or remove materials from the bowl due to the location and orientation of the overhang portion of the mixer body relative to the bowl.

Accordingly, there is a need for a mixer having a bowl that provides convenient access to the bowl.

SUMMARY OF THE INVENTION

The present invention is a mixer having a bowl that is pivotally coupled to the mixer body. The pivotable nature of the bowl enables the bowl to pivot away from the mixer body, which provides convenient access to the bowl. The bowl can also be quickly and easily coupled to, and uncoupled from, the mixer body.

In one embodiment, the invention is a pivotable mixer bowl including a bowl body for receiving material to be mixed, a first mounting bracket coupled to and extending from an outer surface of the bowl body and having an opening therein, and a second mounting bracket coupled to and extending from the outer surface and having an opening therein. The second mounting bracket is vertically spaced from the first mounting bracket. The opening of the second mounting bracket is generally aligned with the opening of the first mounting bracket to define a pivot axis of the mixer bowl. The mixer bowl further includes a locking bracket coupled to and extending from an outer surface of the bowl body.

Other objects and advantages of the present invention will be apparent from the following description and the accompanying drawings.

DETAILED DESCRIPTION

Figure 1:
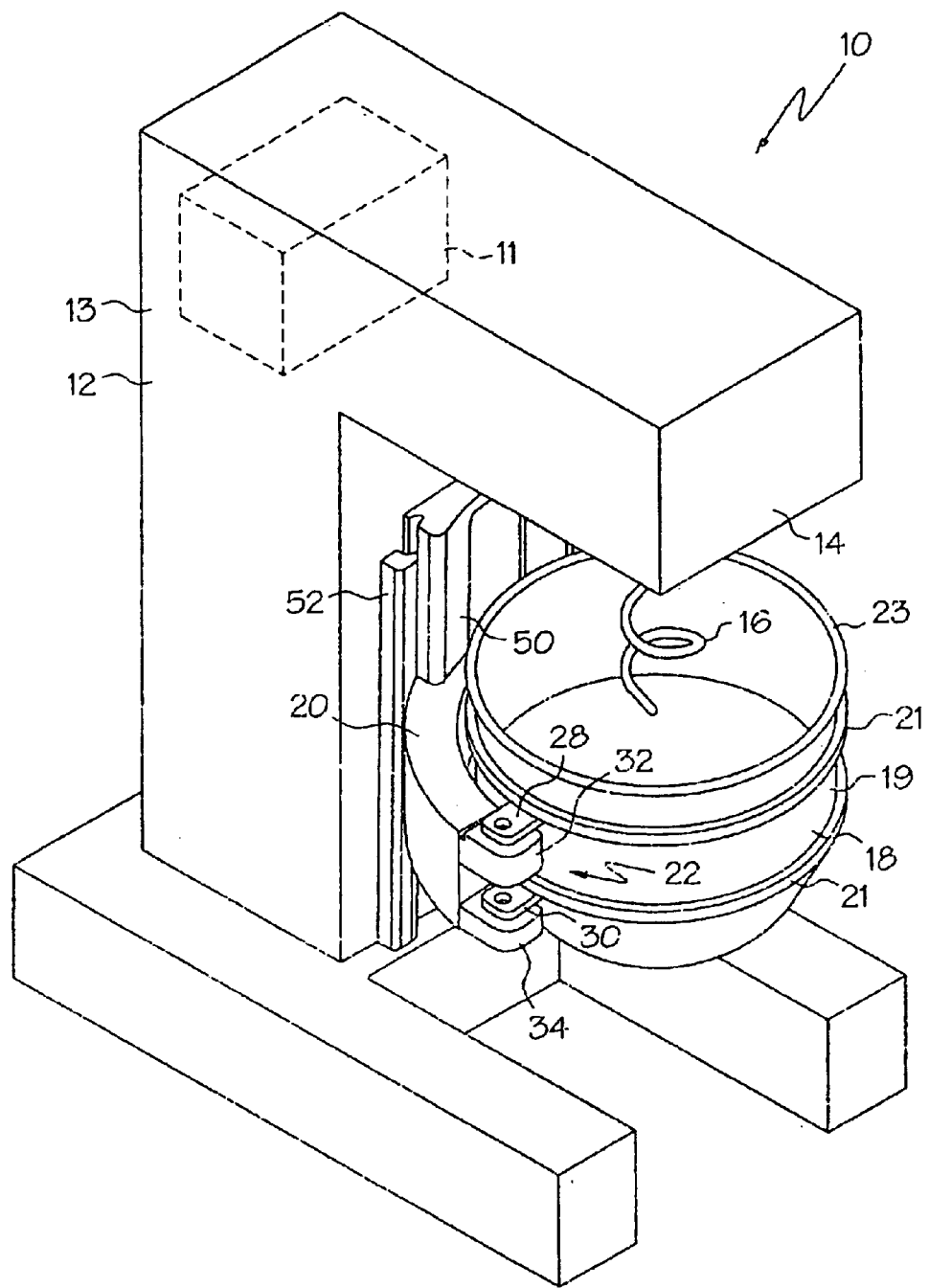
FIG. 1 is a perspective view of one embodiment of the mixer of the present invention.

FIG. 1 illustrates a mixer, generally designated 10, which includes a mixer body 12 having a generally vertically-extending main portion 13 and a overhang portion or transmission head 14. The mixer body 12 includes a yoke 20 coupled to the main portion 13 of the mixer body 12. The yoke 20 is generally semicircular in top view, and is shaped to closely receive a mixer bowl 18 therein. The yoke 20 is coupled to a vertically movable yoke base 50, and the yoke base 50 is vertically movable along a pair of guide rails 52, 54.

Figure 8:
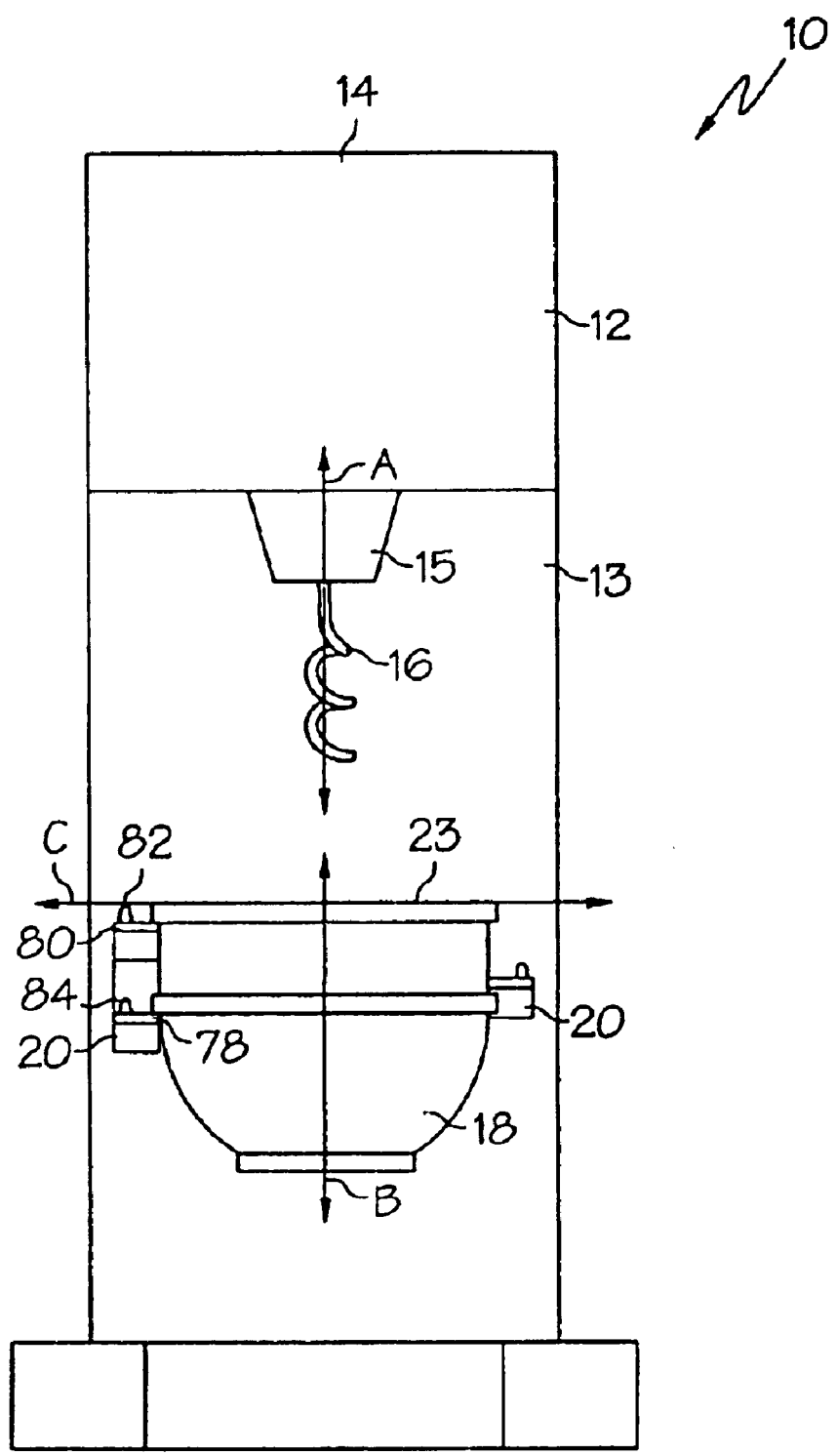
FIG. 8 is a front view schematic representation of the mixer of FIG. 1.

The mixer 10 includes a motor or mixing drive 11 housed in the mixer body 12. The mixing drive 11 is drivingly coupled to an output component 15 (see FIG. 8) to rotate the output component about its central axis A. The mixer 10 includes a generally downwardly-extending mixing element 16 (such as a dough hook) that is removably connected to the output component 15. The mixing element 16 can be any of a wide variety of shapes and can be coupled to the output component 15 by a wide variety of attachment mechanisms, such as a bayonet-style attachment (not shown) as is well known in the art. The bowl 18 is shaped to be mounted to the yoke 20 of the mixer body 12 such that the bowl 18 is closely received in the yoke 20. The bowl 18 includes a bowl body 19 that contains the materials to be mixed (not shown), and a top rim or edge 23 that forms a plane C. The bowl 18 includes a central axis B that is generally perpendicular to the plane C. The bowl 18 also includes pair of vertically spaced bands 21, each band 21 being attached to the bowl body 19, such as by spot welding.

Figure 2:
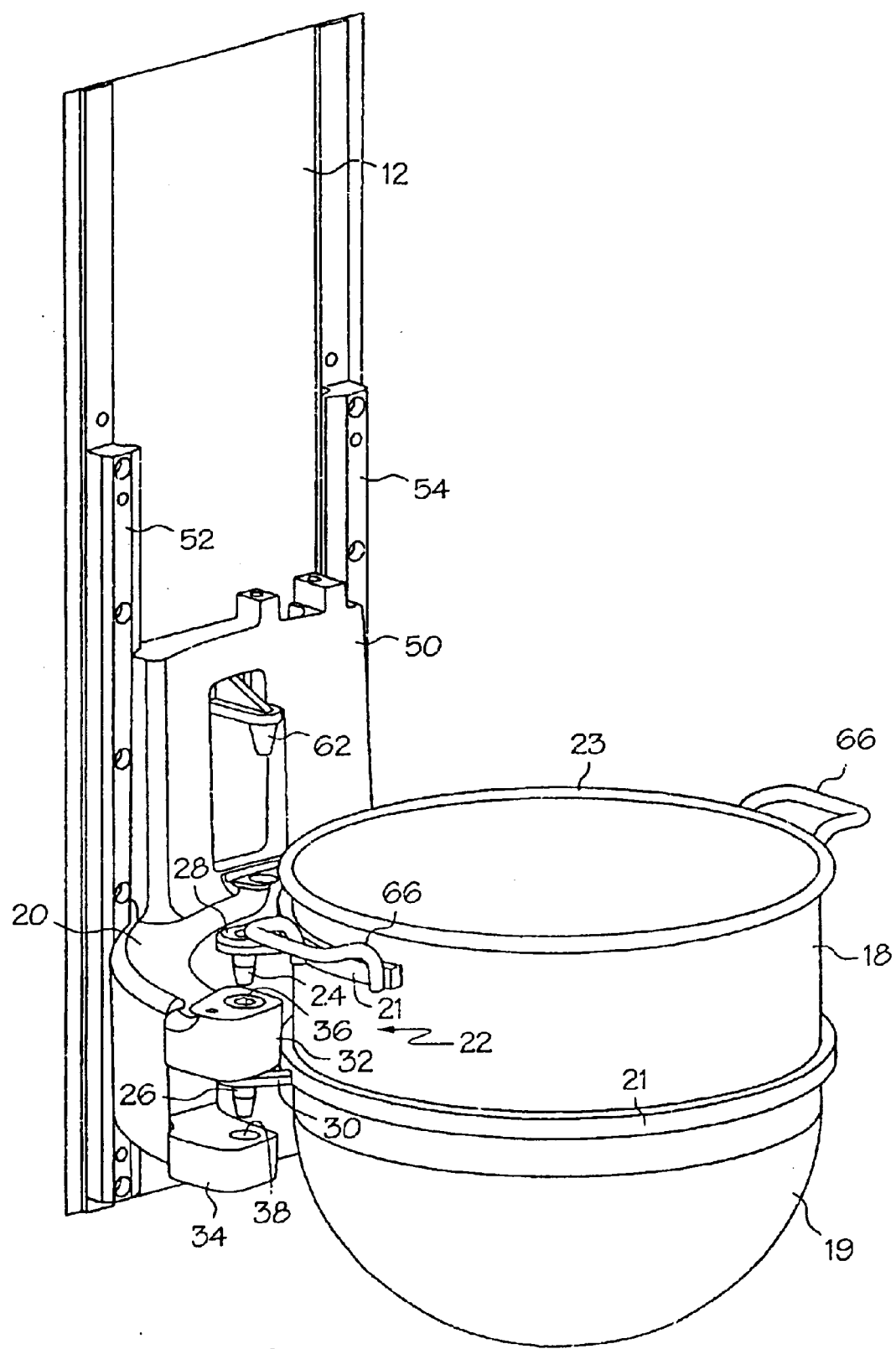
FIG. 2 is a perspective view of the bowl, yoke, and part of the mixer body of the mixer of FIG. 1, with the bowl being vertically spaced away from the yoke.

As shown in FIG. 2, the mixer 10 includes a mounting structure, generally designated 22, which pivotally couples the bowl 18 to the yoke 20 and mixer body 12. In one embodiment, the mounting structure 22 includes a pair of pin arms 28, 30, each pin arm 28, 30 being coupled to and protruding outwardly from the bowl 18. Each pin arm 28, 30 may be coupled to one of the bands, 21, such as by welding, and includes a pin 24, 26, extending generally downwardly from the pin arm 28, 30. In this embodiment, the mounting structure 22 may further include a pair of brackets 32, 34 that are mounted (preferably by casting) onto a distal end of the yoke 20, each bracket 32, 34 having a hole 36, 38 formed therein. As shown in FIG. 2, the pins 24, 26 are generally axially aligned with one another, as are the holes 36, 38.

Figure 3:
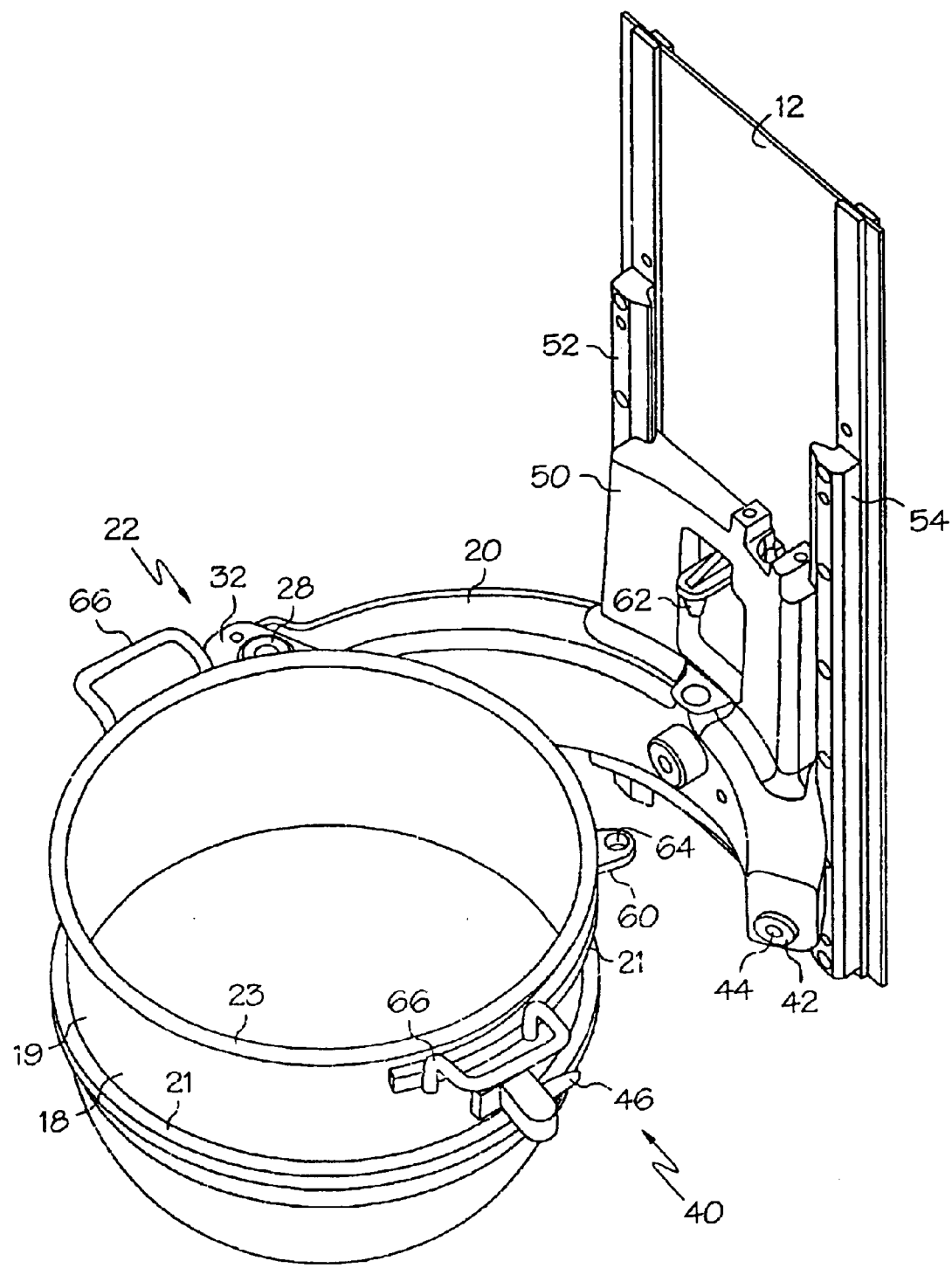
FIG. 3 is a perspective view of the bowl, yoke, and part of the mixer body of FIG. 2, with the bowl coupled to the yoke and in the loading position.

In order to mount the bowl 18 to the mixer body 12, the bowl 18 is positioned such that the pins 24, 26 are aligned with the holes 36, 38 in each bracket 32, 34, as shown in FIG. 2. The bowl 18 is then lowered such that the pins 24, 26 are received in the corresponding holes 36, 38, and the pin arms 28, 30 engage the top surface of the corresponding mounting bracket 32, 34, as shown in FIG. 3. Each pin 24, 26 preferably has a tapered tip to guide the pins 24, 26 into the mounting brackets 32, 34. After each pin 24, 26 is received in a hole 36, 38, each pin/bracket combination forms a hinge about which the bowl 18 can pivot. The bowl 18 is shown in its loading/unloading position in FIG. 3 wherein the bowl is pivoted (at least slightly) away from the mixer body 12 and yoke 20.

Figure 4:
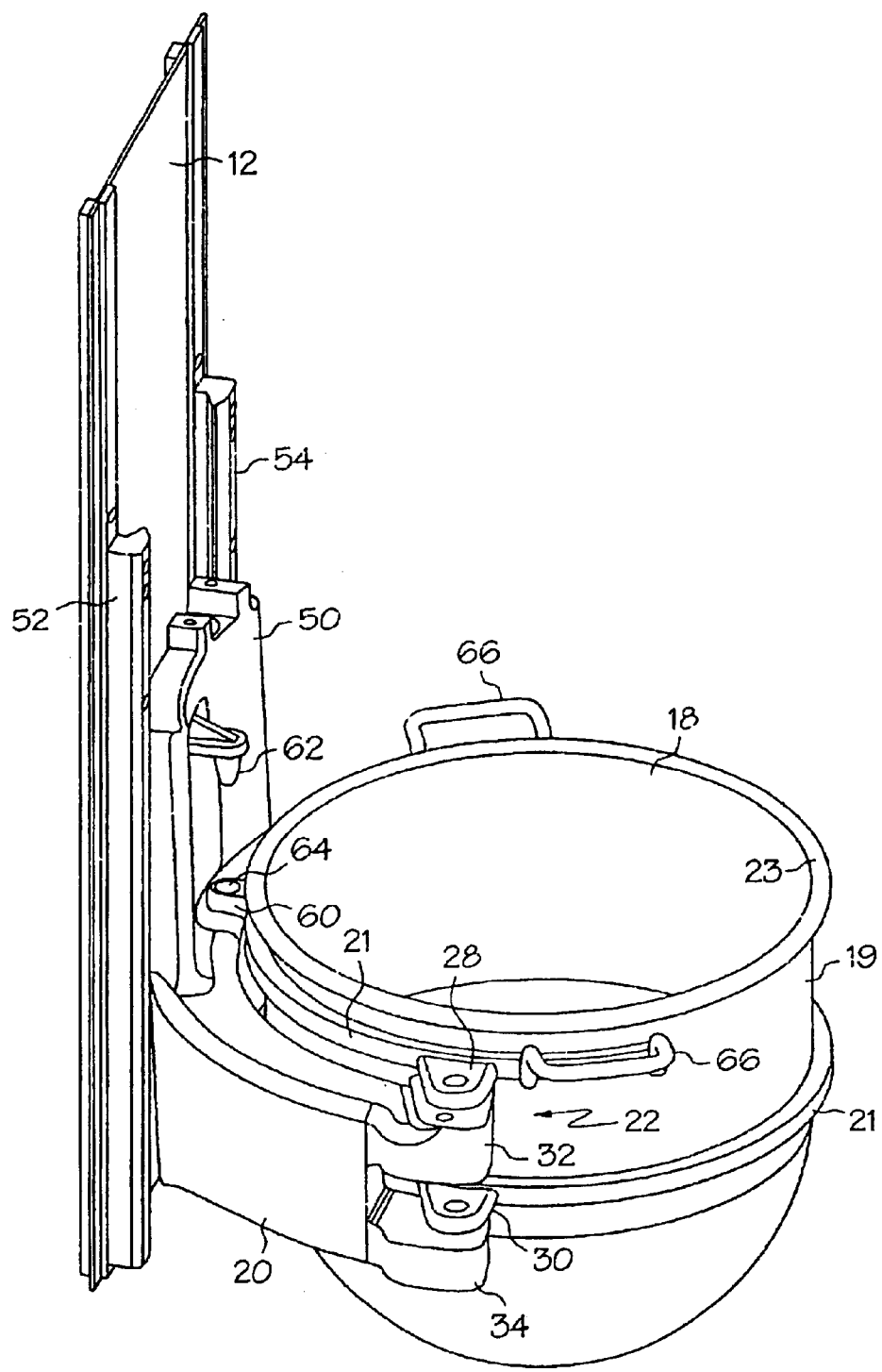
FIG. 4 is a perspective view of the bowl, yoke, and part of the mixer body of FIG. 3, with the bowl in its closed position.

After the bowl 18 is mounted to the mixer body 12, the bowl 18 can then be pivoted from its loading/unloading position of FIG. 3, to its closed position, as shown in FIG. 4. When the bowl 18 is in the closed position, the bowl 18 is located adjacent to the mixer body 12 and received within the yoke 20, and the bowl 18 is aligned such that the mixing element 16 can be received in the bowl 18 when the bowl 18 is raised relative to the mixing element 16. Furthermore, when the bowl 18 is in the closed position, the central axis B of the bowl 18 is preferably aligned with the central axis A of the output component 15, and with the central axis of the mixing element 16.

Figure 5:
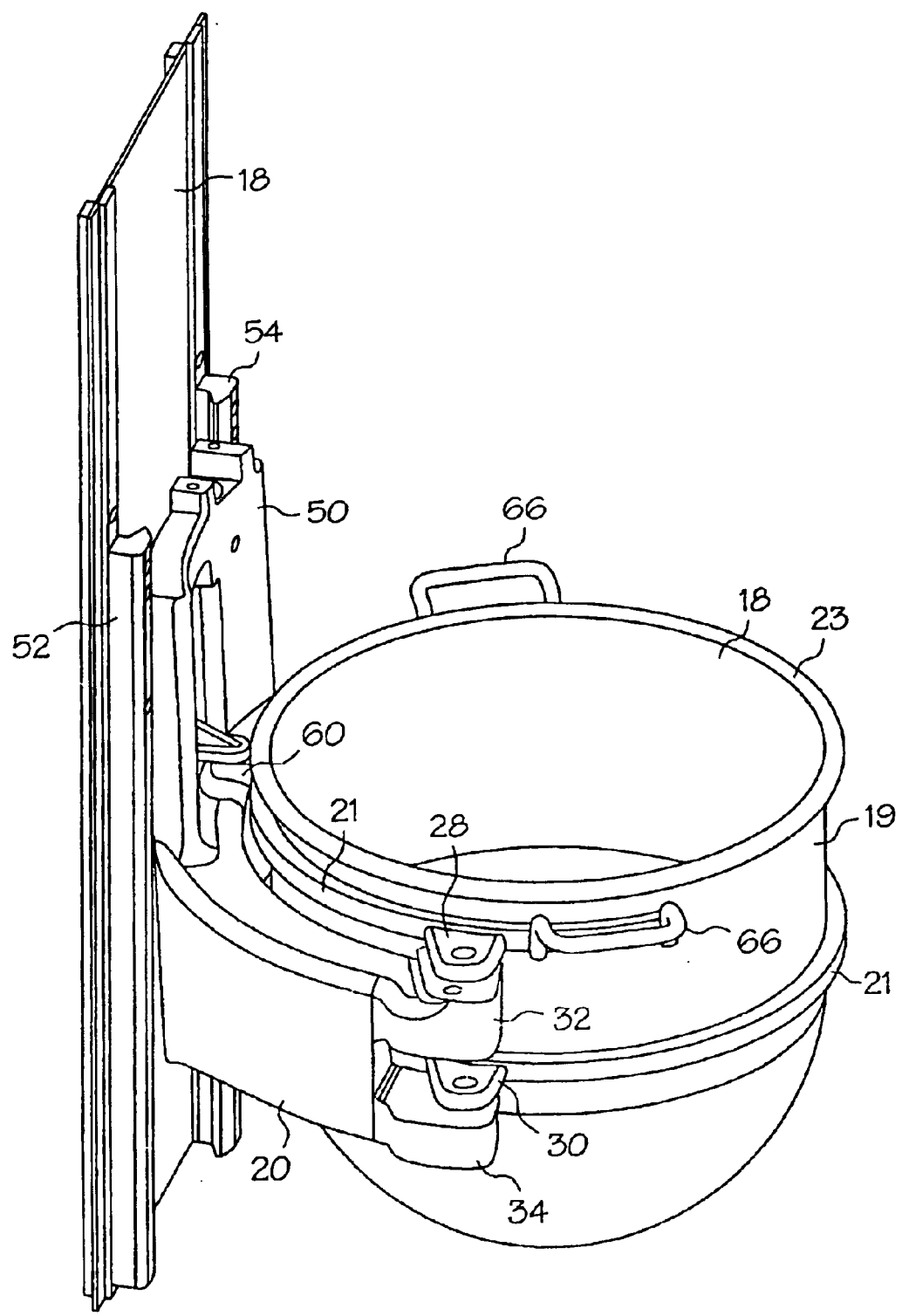
FIG. 5 is a perspective view of the bowl, yoke, and part of the mixer body of FIG. 4, with the bowl in its use position.

In order to move the bowl from its closed position (FIG. 4) to its use position (FIG. 5), the yoke 20 is raised vertically by moving the yoke base 50 along the pair of vertically-extending guide rails 52, 54. Typically, a bowl up/down drive or hand crank (not shown) is used to raise the yoke 20. As the yoke 20 is raised, it also raises the bowl 18 to its use position, as shown in FIGS. 1 and 5. When the bowl 18 is in the use position, the lower portion of the mixing element 16 is received in the bowl 18 such that the mixing element 16 can mix the contents of the bowl 18.

The bowl 18 may include a locking bracket 60 (FIGS. 3 and 4) having an opening 64, and the mixer body 12 may include a generally downwardly-extending locking pin 62. When the bowl 18 is moved to its use position (FIG. 5), the locking pin 62 may be received in the opening 64 of the locking bracket 60 to retain the bowl in the use position; that is, the locking pin/locking bracket combination prevents the bowl 18 from pivoting about the mounting structure 22.

Figure 6:
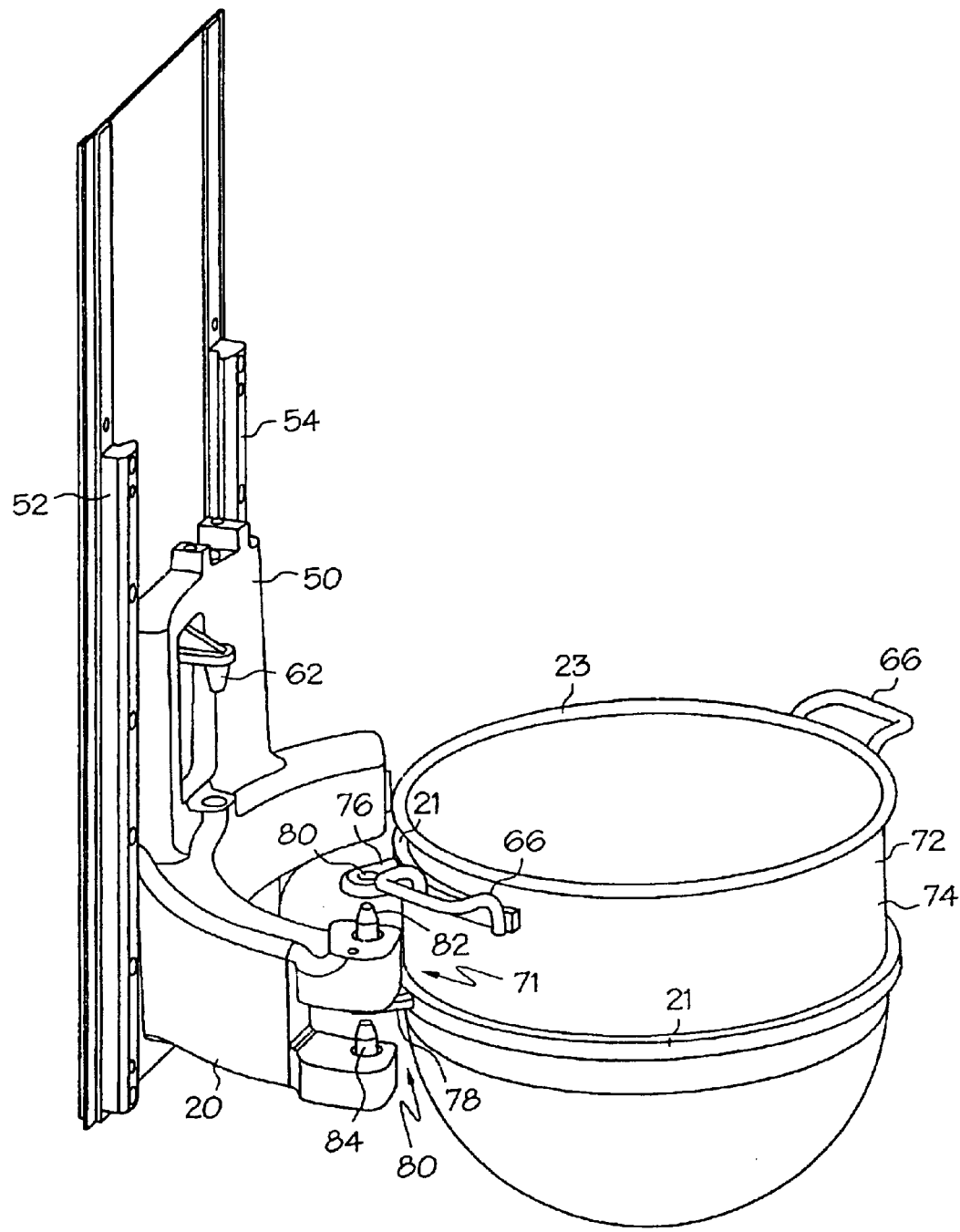
FIG. 6 is a perspective view of a bowl, yoke, and part of mixer body illustrating an alternate embodiment of the mixer of the present invention.

In another embodiment of the invention, the location of the pins and bracket may be reversed. For example, FIG. 6 illustrates a mounting structure 71 for mounting a bowl 72 to the yoke 20. In this embodiment, the bowl 72 has an outer surface 74 and a pair of brackets 76, 78 coupled to and extending outwardly from the outer surface 74. Each bracket 76, 78 may be coupled (such as by welding) to one of the bands 21 and include a generally circular opening 80 formed therein. The mounting structure 71 further includes a pair of pins 82, 84 coupled to and extending upwardly from the yoke 20.

In order to mount the bowl 72 to the yoke 20, the brackets 76, 78 are aligned and located such that the openings 80 can each receive an associated pin 82, 84 therethrough to pivotally couple the bowl 72 to the yoke 20. After the bowl 72 is coupled to the yoke 20, the bowl 72 can be pivoted into and out of the closed position and utilized in the same manner as the bowl 18 described above. Furthermore, it should be understood that the bowl 72 need not necessarily include the brackets 76, 78, and that nearly any structure of the bowl can have the openings 80 formed therein. For example, the bowl 72 may have a lip or other mounting portion (not shown) extending wholly or partially around the perimeter of the bowl 72, and the opening or openings 80 may be located on the lip or other mounting portion. If desired, the lower pin 84 may be slightly shorter than the upper pin 82 to aid in loading and unloading the bowl 72 on the yoke 12.

Figure 7:
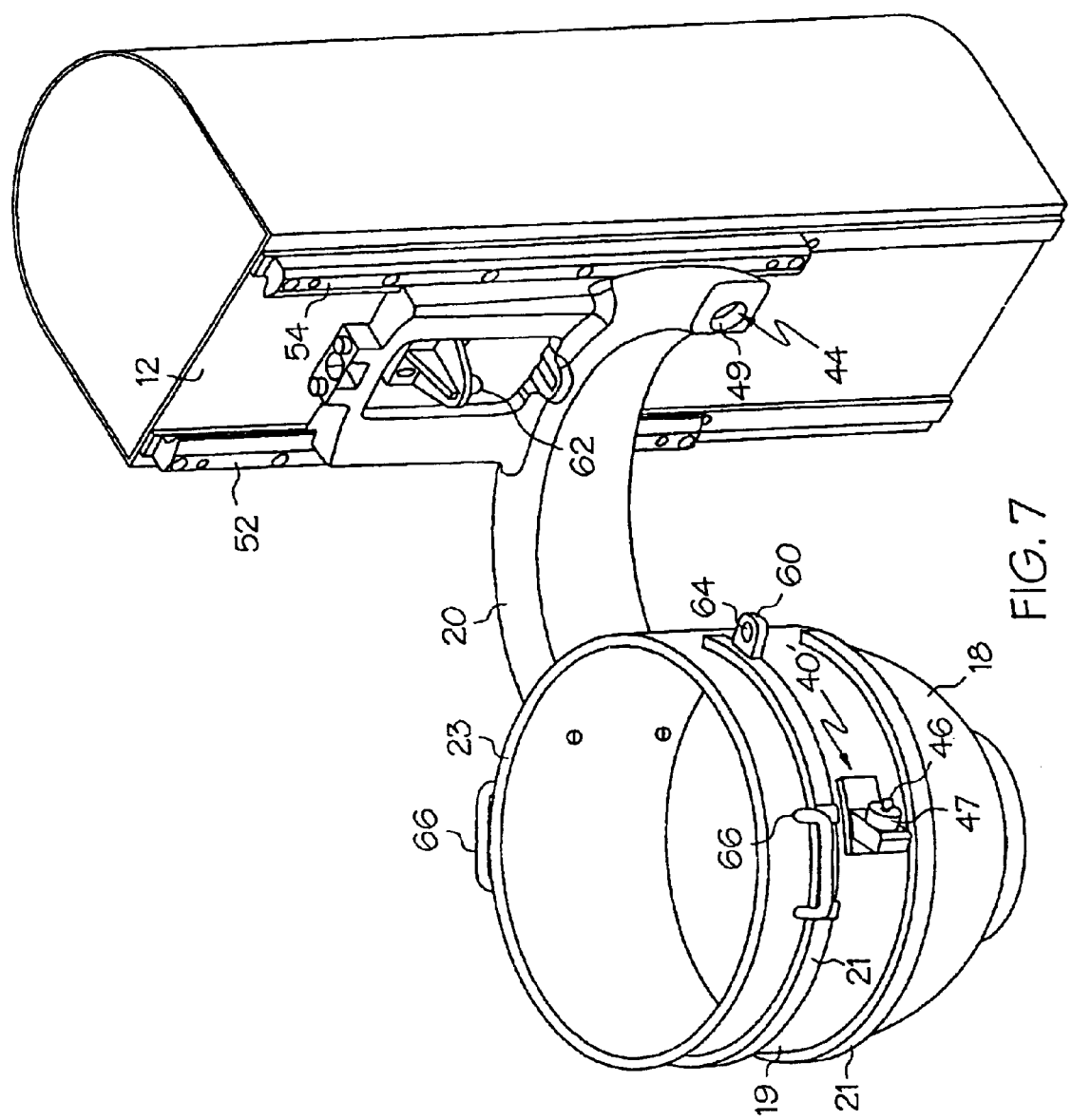
FIG. 7 is a perspective view of a bowl, yoke, and part of a mixer body illustrating a detent mechanism.

The mounting structures 22, 71 enable the bowl 18, 72 to be pivoted out from under the overhang portion 14 of the mixer body 12 to its loading/unloading position, as shown in FIG. 7. While in the loading/unloading position, the bowl 18, 72 provides easy access to the inner cavity of the bowl for loading and unloading materials in the bowl. Furthermore, when in the loading/unloading position, the handles 66 are pivoted away from the mixer body 12 and located in a convenient position for gripping.

The brackets 32, 34 or 76, 78 preferably provide sufficient support so that the central axis B of the bowl 18, 72 is generally not skewed during the pivoting motion of the bowl 18, 72 (i.e., pivoting motion of the bowl into and out of the closed position and the loading/unloading position). More particularly, the orientation of the central axis B of the bowl 18, 72 relative to the mixer body 12 preferably does not generally move during any pivoting motion of the bowl 18, 72. In other words, although the central axis B may be moved laterally during pivoting motion of the bowl, 18, 72 the orientation of the central axis B preferably remains generally stationary relative to the mixer body or the axis A or the axis of rotation of the mixing component 16. In one embodiment, the central axis B of the bowl 18, 72 preferably is and remains generally parallel to the central axis A of the output component 15 and the central axis of the mixing component 16 during any pivoting movement of the bowl 18, 72. The output component 15 may be or include a planetary gear system. In this case, the central axis A of the output component 15 is the central axis about which the planetary gears orbit.

The bowl 18, 72 preferably pivots in the plane C that is defined by the upper lip or edge 23 of the bowl 18, 72 during all pivoting motion of the bowl 18, 72, and the plane C remains stationary relative to the mixer body 12. This feature ensures that the bowl 18, 72 can be rotated smoothly into and out of the closed position such that the user is not required to lift the bowl during any pivoting motion of the bowl 18. The brackets 32, 34, 76, 78 and pins 24, 26, 82, 84 preferably cooperate to ensure such smooth, planar pivoting of the bowl 18, 72. For example, the brackets 32, 34 and 76, 78 are preferably vertically spaced apart from each other by a sufficient distance to prevent the bowl 18, 72 from tilting during its pivoting movement.

Figure 18:
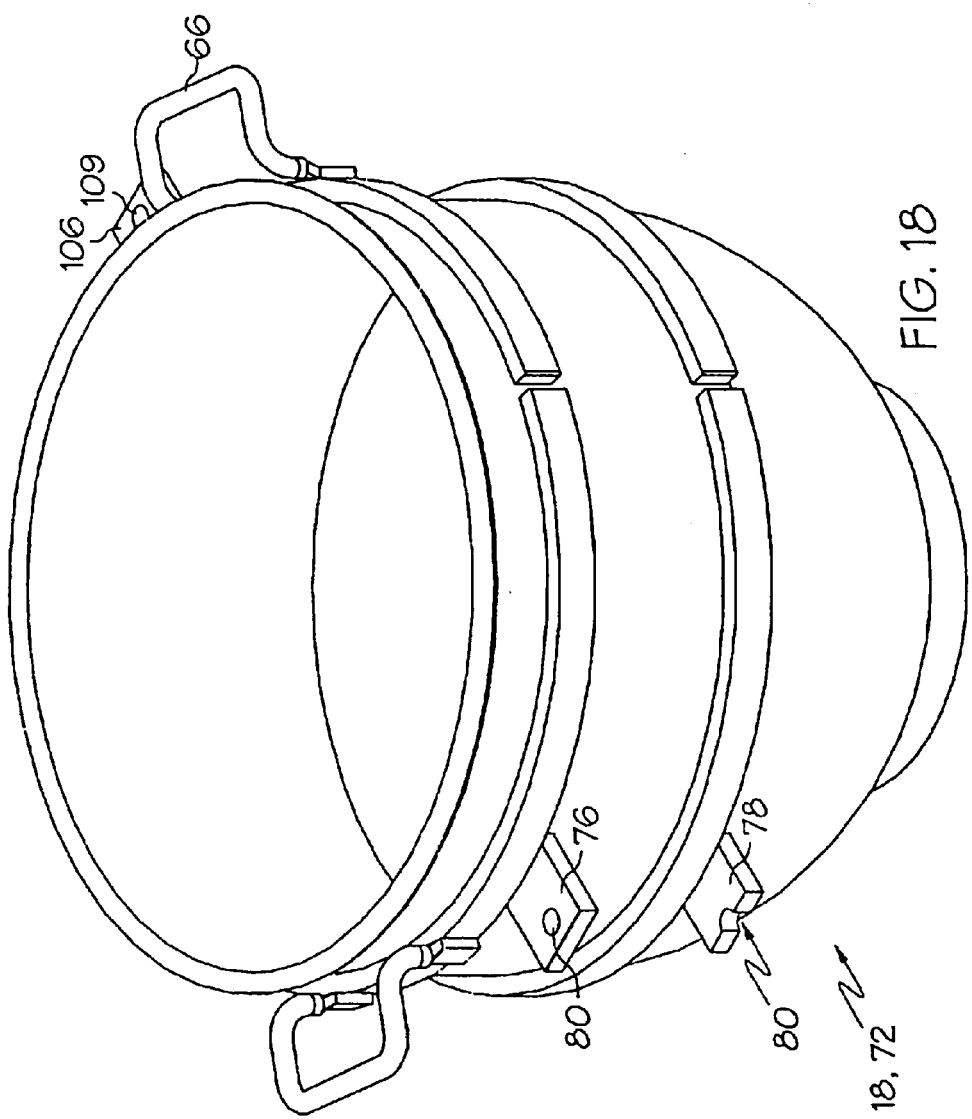
FIG. 18 is a perspective view of another embodiment of a bowl.
Figure 19:
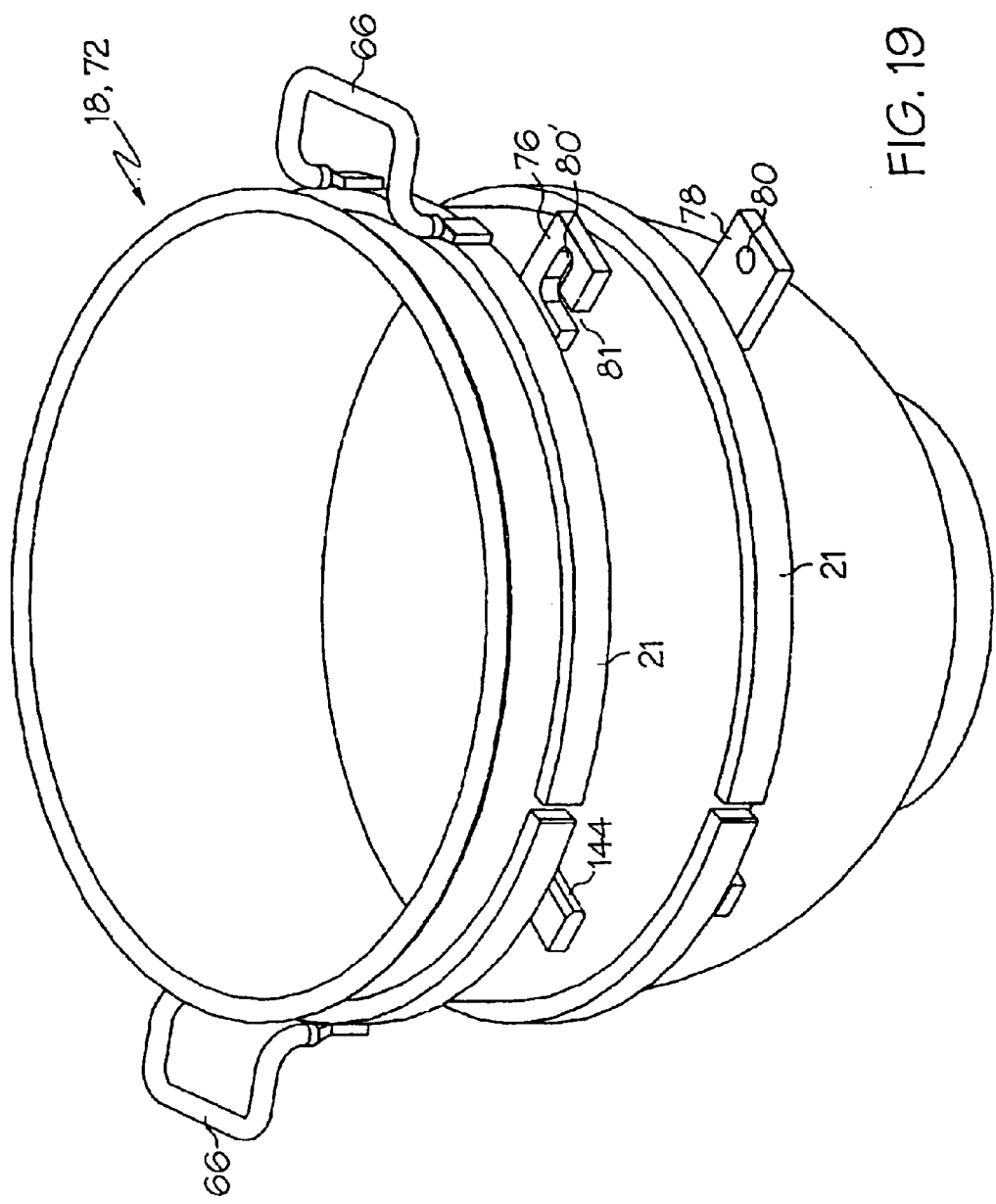
FIG. 19 is a perspective view of another embodiment of a bowl.

Any variety of pins and brackets may be used for mounting the bowl 18 to the mixer body 12. For example, the pins 24, 26, 82, 84 and associated holes or openings preferably have a generally circular, or nearly circular (i.e. hexagonal, elliptical, etc.), cross section, although pins and openings having other shapes may be used without departing from the scope of the invention. For example, as shown in FIGS. 18 and 19, at least one of the brackets 76, 78 may include only a partial opening 80' (i.e. an opening that is not fully enclosed). In FIG. 18, the opening 80' is generally semicircular in top view. In FIG. 19, the opening 80' is a nearly complete opening but includes a slot 81. Thus, it should be understood that the "openings" of the present invention need not necessarily include enclosed openings.

Although each of the bracket 32, 34 (or 76, 78) are illustrated as being attached to the bowl 18, 72, only one of the brackets 32, 34 (or one of the brackets 76, 78) need to be coupled to the bowl 18, 72. When only one of the brackets 32, 34 (or one of the bracket 76, 78) is coupled to the bowl, the other bracket may be coupled to the bracket that is coupled to the bowl. For example, with reference to FIG. 6, only the upper bracket 76 may be coupled to the bowl, and the lower bracket 78 may be coupled to a generally vertically-extending coupling member (not shown) that is located outside of the yoke 20 and coupled to the upper bracket 76. In this manner, the upper bracket 76, lower bracket 78, and coupling member may form a generally "C" shape in side view.

Furthermore, the bowl 18, 72 may be a two-piece bowl. For example, the bowl may include a first part which is an annular collar that includes the associated brackets 32, 34, 76, 78 located thereon. The first part of the bowl may be a collar similar to one of the rings 21, but the collar may be thick enough to support at least two of the vertically-spaced brackets 32, 34, 76, 78. In this case, collar can be pivotally coupled to the yoke, 20, and the second part of the bowl 18, 72 may be a bowl body that has a smooth outer surface that can slip into, or be lifted out of, the collar.

The mixer 10 may include a detent mechanism to maintain the bowl 18, 72 in its closed position while the bowl 18, 72 is raised and lowered, or during mixing operations. For example, FIG. 3 illustrates one detent mechanism, generally designated 40, that may be used to maintain the bowl 18 in its closed position (the detent mechanism 40 may also of course be used with the bowl 72 or any other bowl used with the mixer). In this embodiment, the detent mechanism 40 is preferably located on an opposed side of the bowl 18 relative to the mounting structure 22. In the illustrated embodiment, the detent mechanism 40 includes a relatively soft, deformable washer 42 mounted on the yoke 20 and having a central opening 44 formed therein. The detent mechanism 40 also includes a forwardly extending peg 46 mounted on the bowl 18. The opening 44 in the washer 42 is slightly smaller than the largest portion of the peg 46, such that when the bowl 18 is moved to its closed position, the peg 46 is forced into the washer 42, which retains the peg 46 therein by an interference fit. In this manner, the detent mechanism 40 helps to maintain the bowl 18 in the closed position.

An alternate embodiment of the detent mechanism 40' is shown in FIG. 7. Again, although FIG. 7 illustrates the detent mechanism or guide 40' in conjunction with the bowl 18, the detent mechanism 40' may be used with the bowl 72 or any other bowl used with the mixer. In this embodiment, the peg 46 is mounted onto a washer 47, and the yoke 20 has a recess 49 shaped to receive the washer 47 therein. In this manner the bottom surface of the recess 49 may support some of the weight of the bowl 18 when the bowl 18 is in the closed position, and therefore the yoke 20 can help to support the weight of the bowl 18 when the washer 47 is received in the recess 49.

The portion of the detent mechanisms 40, 40' located on the bowl 18 can be located on nearly any surface of the bowl 18 that can engage a corresponding part located on the mixer body 12. Preferably, the portion of the detent mechanisms 40, 40' located on the bowl 18 are located on a portion of the bowl 18 that is located adjacent the yoke 20 when the bowl 18 is in the closed position. Furthermore, the orientation of various components of the detent mechanisms 40, 40' can be reversed. For example, the peg 46 of the detent mechanism 40 may be located on the mixer body 12 and the washer 42 may be located on the bowl 18. Similarly, the locking bracket 60 may be located on the bowl 18 and the locking pin 62 may be located on the mixer body 12.

FIGS. 9–12 illustrate yet another detent mechanism 104 that may be used with the mixer of the present invention. FIGS. 9–12 illustrate the detent mechanism 104 used with a bowl 102, although the detent mechanism 104 can be used with the bowls 18, 72 shown and described earlier, or nearly any other bowl used with the mixer. The bowl 102 of FIGS. 9–12 is similar to the bowl 72 of FIG. 6 in that the bowl 102 has brackets 76, 78 (not shown in FIGS. 9–12) with openings 80 therein, and the yoke 20 has upwardly-extending pins 82, 84 (not shown in FIGS. 9–12) similar to the yoke 20 shown in FIG. 6. The detent mechanism 104 includes a locking bracket 106 coupled to an outer surface 108 of the bowl 102, the locking bracket 106 including a generally circular opening 109 therein. The yoke 20 may have a generally hemispherically-shaped stainless steel pad 120 located thereon. The detent mechanism 104 includes a pivotable lock handle 110, which includes a gripping portion 107.

Figure 9:
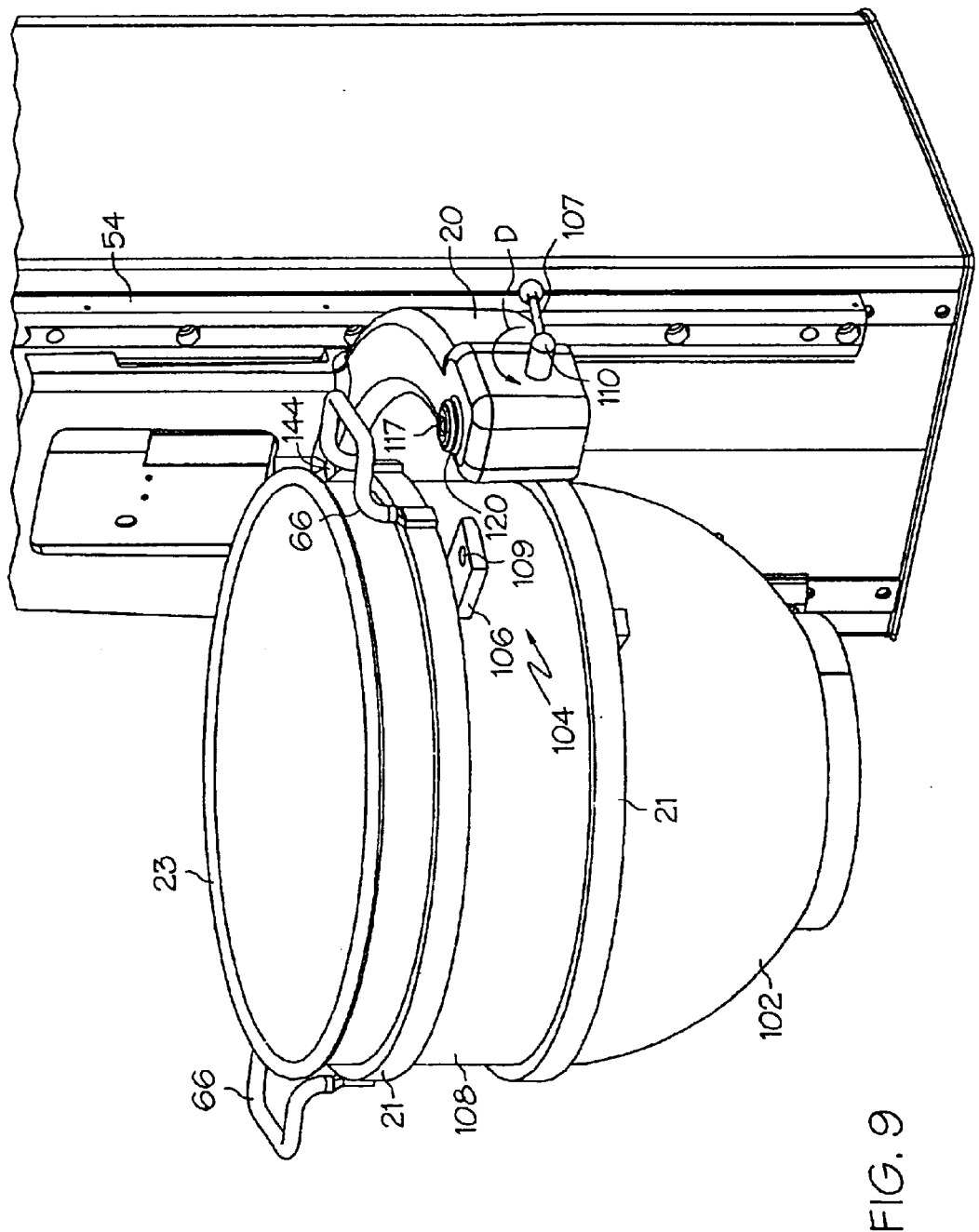
FIG. 9 is a perspective view of a bowl, yoke, and part of a mixer body, illustrating another detent mechanism, with the bowl in the loading position.
Figure 12:
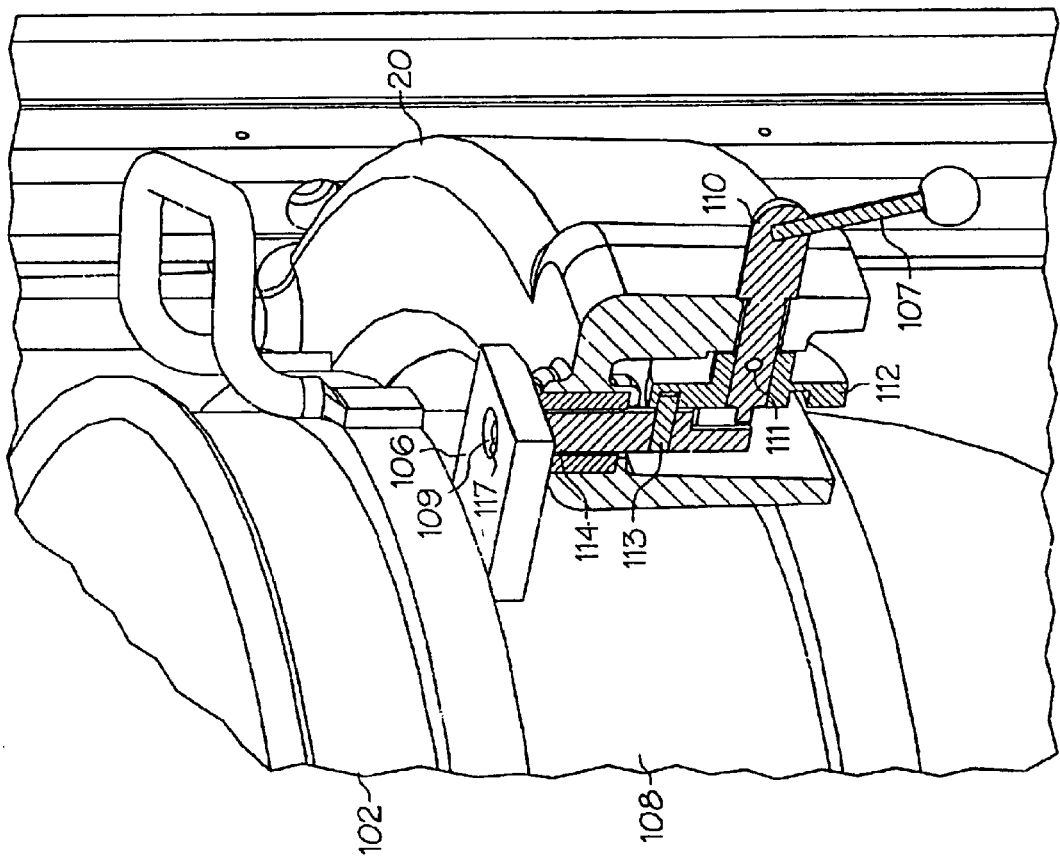
FIG. 12 is a perspective partial cross section of the locking mechanism of the mixer of FIG. 9.

As shown in FIG. 12, the lock handle 110 is rotationally coupled to a cam 112 via a pin (not shown) passed through aligned openings 111 formed in both the handle 110 and cam 112. The cam 112 is in turn rotationally coupled to a locking pin 114 via a drive pin 113. The locking pin 114 is generally vertically oriented, and includes a generally hemispherical tip 117 received in the pad 120. The lock handle 110, cam 112 and locking pin 114 are rotationally coupled together such that the lock handle 110 can be pivoted to cause the locking pin 114 to be moved vertically. For example, FIG. 9 illustrates the detent mechanism 104 in its unlocked position wherein the locking pin 114 is flush with, or recessed below, the pad 120. When the lock handle 110 is rotated in the direction of arrow D of FIG. 9, the cam 112 is rotated in the direction of arrow D and the locking pin 114 is moved vertically upwardly such that the locking pin 114 protrudes above the pad 120 (see FIGS. 10 and 10A wherein the lock handle 110 has been rotated about 270°). Conversely, the lock handle 110 can be rotated in the direction of arrow E of FIGS. 10 and 10A to move the locking pin 114 vertically downwardly such that the locking pin 114 is flush with or recessed below the pad 120.

Figure 10:
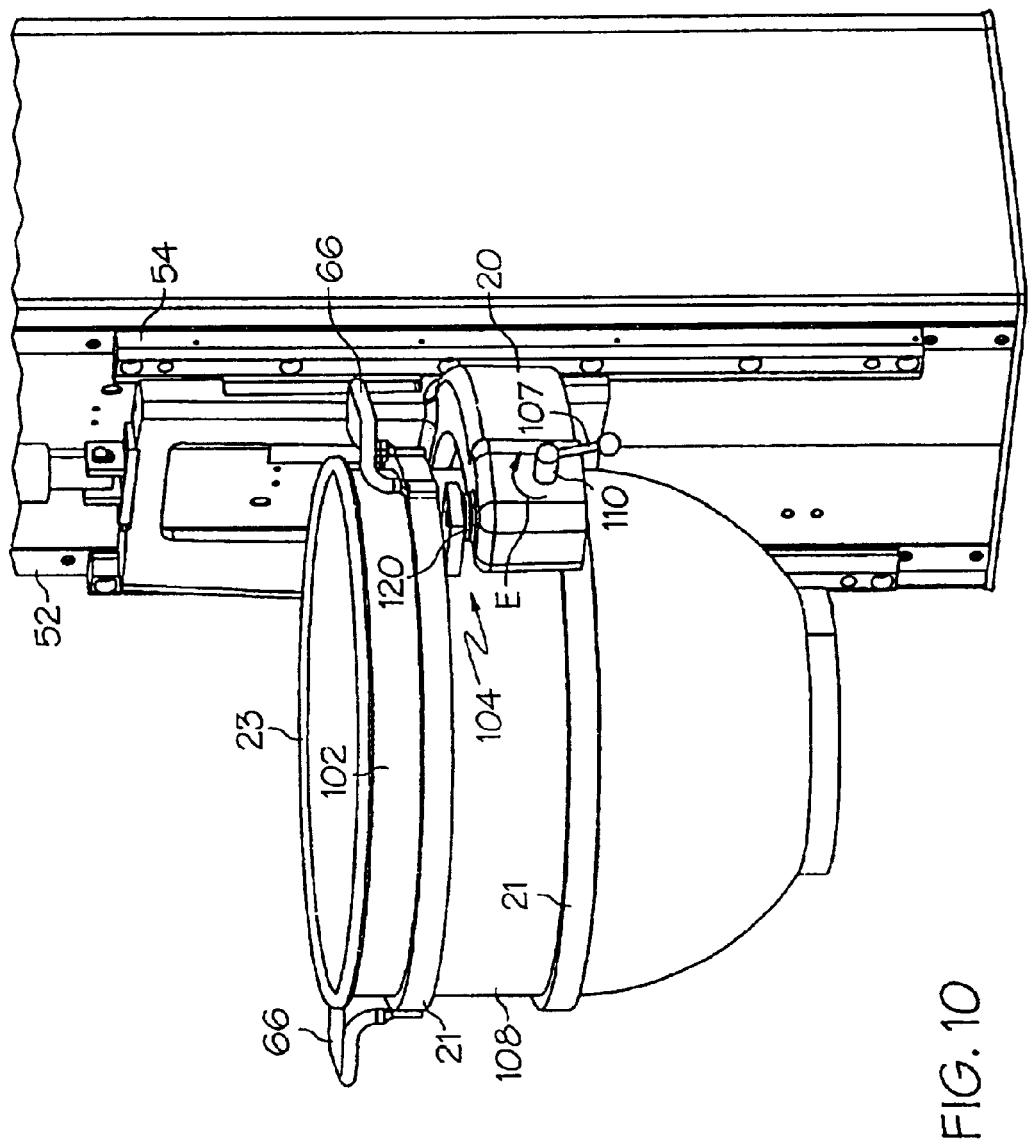
FIG. 10 is a perspective view of the bowl, yoke, and part of the mixer body of FIG. 9, with the bowl in its closed position.

In this manner, when the bowl 102 is in its closed position as shown in FIG. 10, the lock handle 110 can be rotated such that the tip 117 of the locking pin 114 protrudes above the pad 120 and is received in the opening 109 of the locking bracket 106 to maintain the bowl 102 in its closed position. When it is desired to release the detent mechanism 104 and move the bowl 102 out of the closed position, the handle 110 is rotated in the direction of arrow E to retract the locking pin 114. In this manner, the locking pin 114 effectively operates as a retractable mounting pin. The locking pin 114 could also be maintained in the extended position by friction, an over-center mechanism, or another detent or other similar means. Of course, a wide variety of other detent mechanisms may be used to maintain the bowls 18, 72, 102 in the closed position without departing from the scope of the invention, including a variety of latches, hooks, interengaging geometries, clasps, clips, frictionally engaging surfaces, magnets and the like. For example, the bowl may include an outwardly-extending protrusion, and the yoke may include a recess that is shaped to receive the protrusion therein. In this manner, in order to move the bowl into its closed position, the bowl may be lifted slightly upwardly and pivoted into the closed position such that the protrusion is located over the recess. The bowl can then be lowered such that the protrusion is received in the recess to maintain the bowl in the closed position.

Figure 10A:
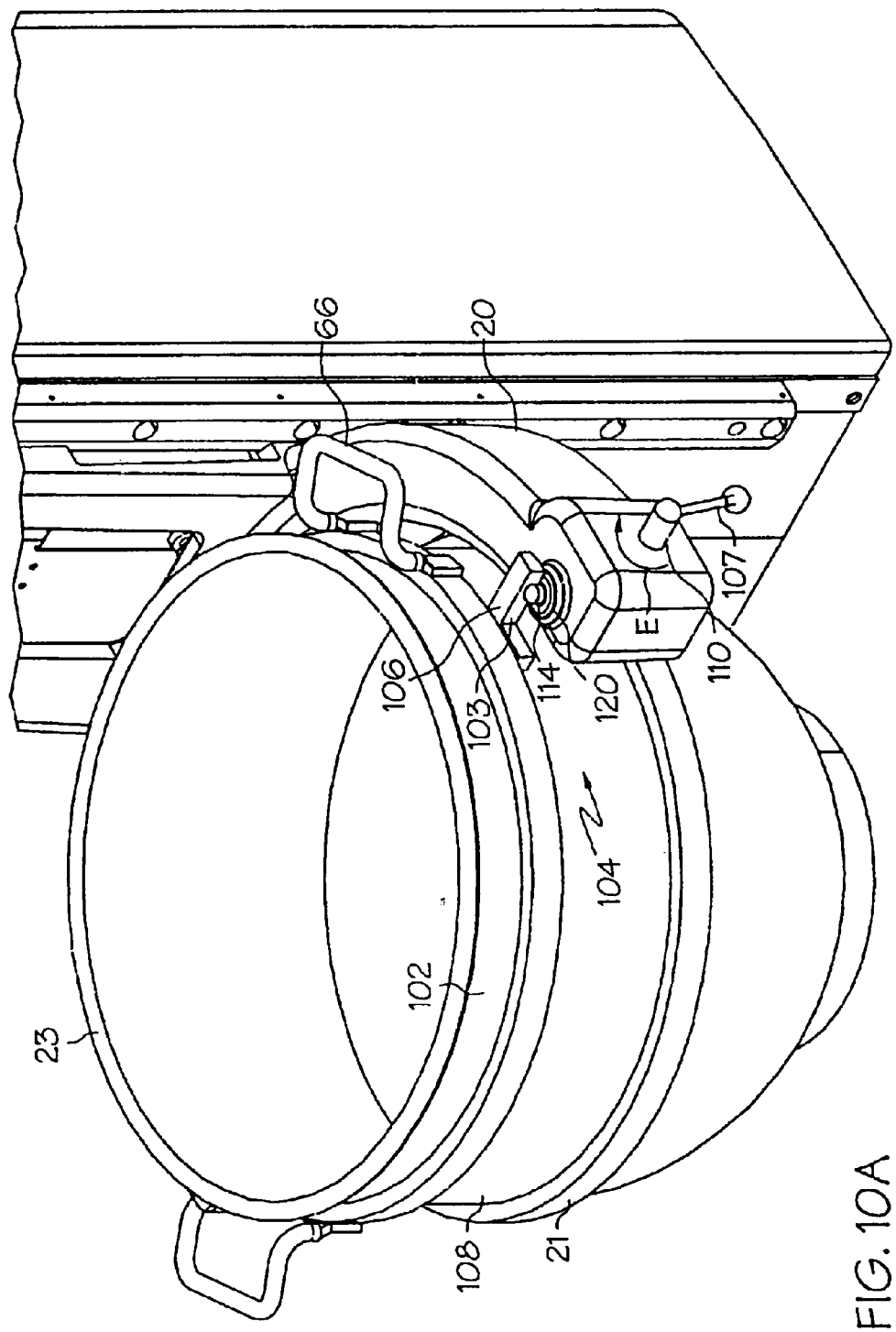
FIG. 10A is a perspective view of the bowl, yoke, and part of the mixer body of FIG. 10 illustrating an alternate bracket.
Figure 11:
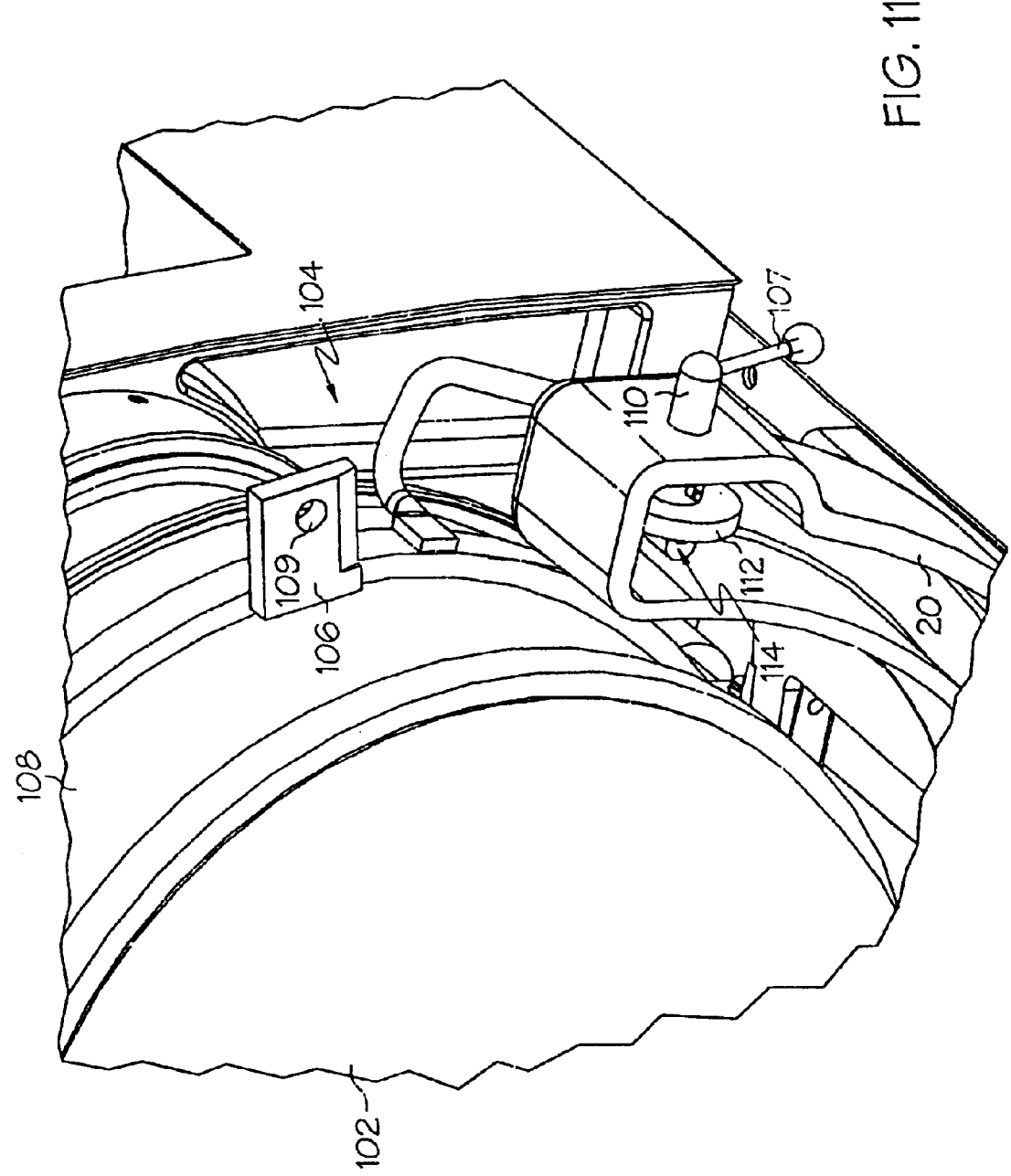
FIG. 11 is a bottom detail view of the bowl, yoke, and part of the mixer body of FIG. 9.

Although the bracket 106 preferably includes an opening 109 located therein such that the bowl 102 is blocked from pivoting in both directions, the bracket 106 need not include an opening 109 located therein as shown in FIG. 10A. In this case, the bracket 106 is located behind the locking pin 114, and the bracket 106 has an engagement surface 103 which engages the locking pin 114 and prevents the bowl 102 from pivoting away from the closed position. Thus, the bowl 102 can include nearly any protrusion, bracket, pin, or the like that can be located behind the locking pin 114 when the locking pin 114 is in its extended position. Furthermore, instead of including a hole or opening, the bracket 106 may include an indentation that receives the pin therein. The bracket 106 may also include a partial opening similar to the openings 80' shown in FIGS. 18 and 19.

Figure 13:
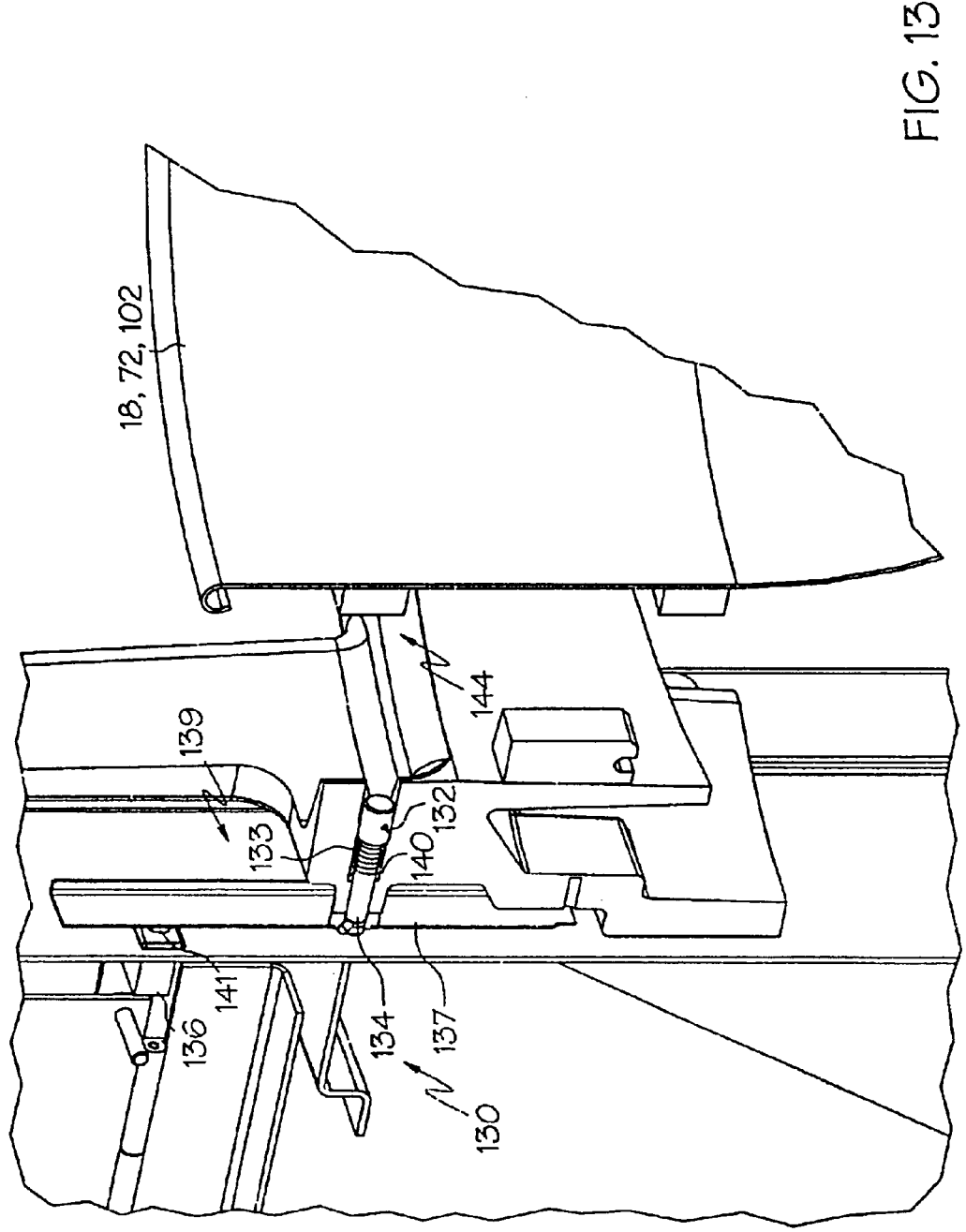
FIG. 13 is a perspective partial cross section of the mixer of FIG. 9, illustrating the bowl switch in its open position.
Figure 14:
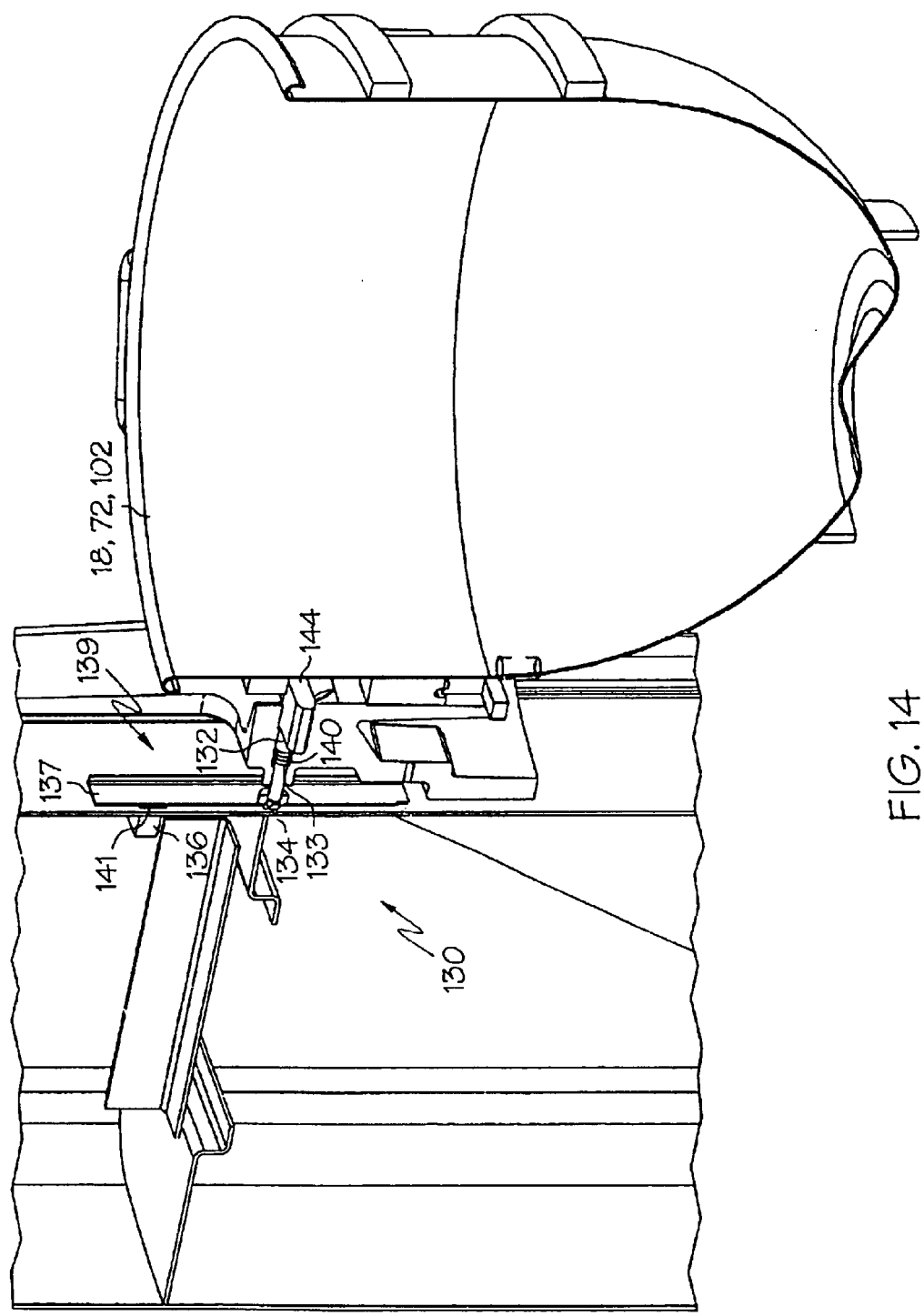
FIG. 14 is a perspective partial cross section of the mixer of FIG. 9, illustrating the bowl switch in its closed position.
Figure 15:
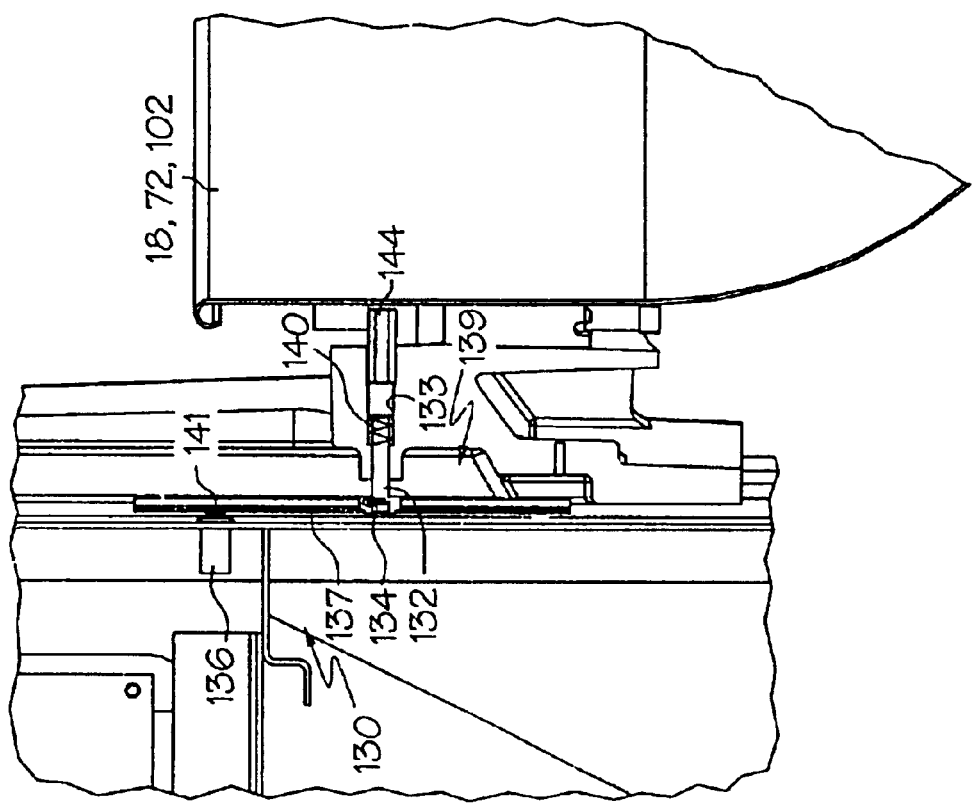
FIG. 15 is a side cross section of the bowl of FIG. 9, illustrating the bowl switch in its closed position.

As illustrated in FIGS. 13–15, the mixer of the present invention may also include a sensor, generally designated 130, to detect when the bowl 18, 72, 102 is in its closed position. In the illustrated embodiment, the sensor 130 includes a spring loaded plunger 132 that is received in a slot 133 of the mixer body 12. The inner end 134 of the plunger 132 is coupled to a generally vertically-extending switch plate 137. The plunger 132 and switch plate 137 together form an actuating assembly 139. The sensor 130 also includes a limit switch 136 having a trigger 141 coupled to the mixer body 12. The sensor 130 includes a spring 140 located about the plunger 132 to bias the plunger 132 away from the mixer body 12 and toward the bowl 18, 72, 102. In this manner, in the absence of outside forces the switch plate 137 is spaced away from the trigger 141.

The bowl 18, 72, 102 may include a lug or protrusion 144 located on an outer surface of the bowl and extending generally outwardly therefrom. As shown in FIGS. 14 and 15, the protrusion 144 is shaped to engage the plunger 132 and move the plunger 132 inwardly (thereby compressing the spring 140) when the bowl 18, 72, 102 is located in the closed position. When the protrusion 144 engages the plunger 132 and moves the plunger 132 inwardly, the switch plate 137 is pressed into contact with the trigger 141 of the limit switch 136, thereby triggering the limit switch 136. The limit switch 136 can then send a signal to a central controller, processor or CPU of the mixer to indicate that the bowl 18, 72, 102 is in the closed position. In one embodiment, the bowl 18, 72, 102 and/or plunger 132 may include a disengagement feature such that the protrusion 144 engages and pulls the plunger 132 outwardly when the bowl 18, 72, 102 is pivoted away from its closed position. The disengagement feature may includes various inter engaging geometries, rotating cams and the like.

Once the bowl 18, 72, 102 is in its closed position and the limit switch 136 is triggered, the bowl may be raised into the operating position and the contents of the bowl may be mixed by the mixing element 16. The switch plate 137 is coupled to the yoke 20 and therefore moves vertically with the yoke 20 and bowl 18, 72, 102 as the yoke 20 is moved. Thus, the switch plate 137 may be a relatively long, vertically extending strip that slides over the trigger 141 as the yoke 20 is raised so that the switch plate 137 can thereby maintain the limit switch 136 in its closed or triggered state. Thus, the switch plate 137 is preferably long enough such that at least part of the switch plate 137 is located over the trigger 141 for the entire vertical range of motion of the yoke 20.

If desired, the spring 140 may be sufficiently stiff such that the bowl 18, 72, 102 cannot remain in the closed position without activating the detent mechanism 104. In other words, the spring 140 may cause the bowl 102 to pivot out of the closed position unless the detent mechanism 104 is activated to lock the bowl 18, 72, 102 in the closed position. In this manner, the ejection of the bowl 18, 72, 102 out of the closed position by the spring 140 can serve as a reminder to the operator to activate the detent mechanism 104. Of course, the mixer may have another spring or other structure besides the spring 140 to eject the bowl out of the closed position.

Figure 16:
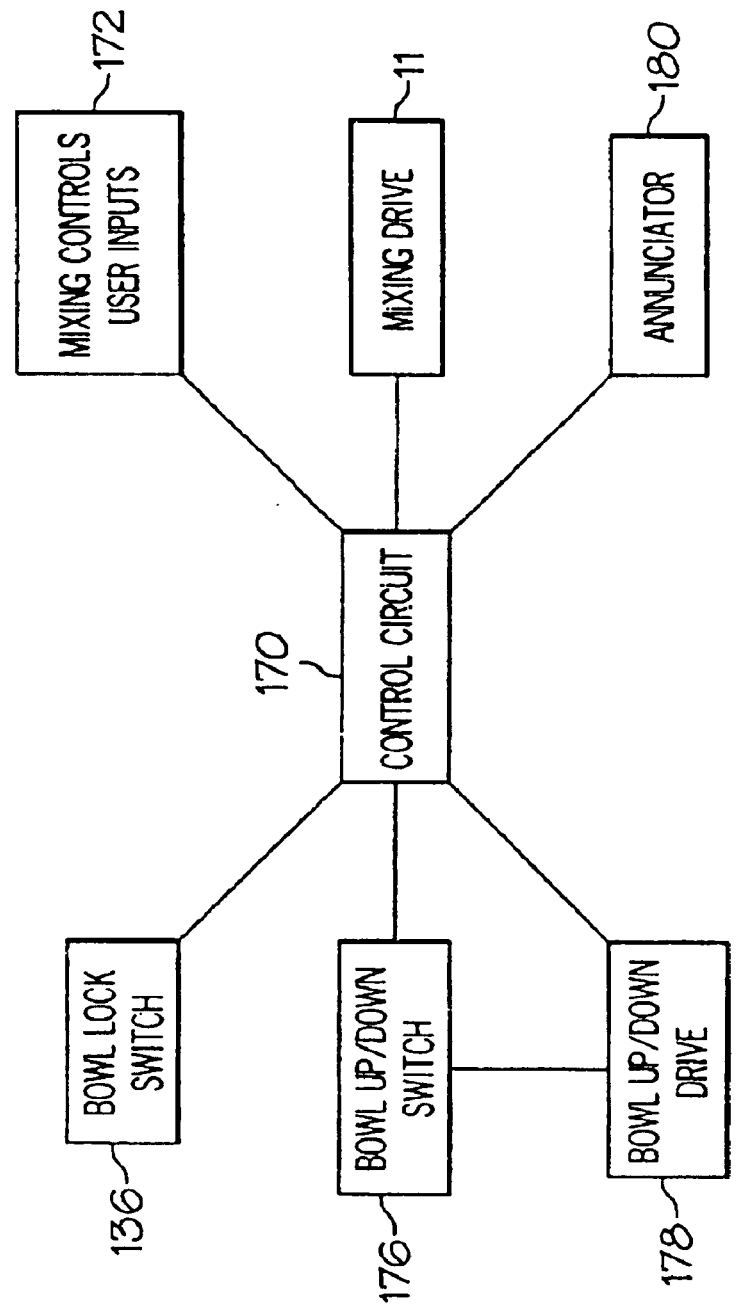
FIG. 16 is a block diagram illustrating one embodiment of a control structure architecture that may be used to control a mixer.

FIG. 16 illustrates a block diagram of a control structure that may be used in association with the sensor 130 to control mixer operations. The limit switch or lock switch 136 is preferably coupled to a control circuit 170. The control circuit 170 is coupled to a user input panel 172, which can be operated by a user to input the desired rotational speed of the mixing element 16, the duration of mixing, etc. The control circuit 170 is also coupled to the mixing drive 11 to control the rotation of the output component 15 and mixing element 16. The mixer may also include a bowl up/down switch 176 that can be actuated by an operator to trigger a bowl up/down drive 178 to raise and/or lower the yoke and bowl. The bowl up/down switch 176 is coupled to the control circuit 170 and to the bowl up/down drive 178 which drives the vertical movement of the bowl and yoke. The bowl up/down drive 178 is also coupled to the control circuit 170. The control circuit 170 is also connected to an annunciator 180, such as a buzzer, that can be activated upon the occurrence of certain events.

The control structure of FIG. 16 may be used to ensure that the switch 136 must be closed before the bowl up/down drive 178 and the mixing drive 11 are activated. More particularly, if the switch 136 is not closed, the control circuit 170 may disable the mixing drive 11, bowl up/down drive 178 and/or the bowl up/down switch 176. Alternately, if the switch 136 is not closed, the up/down drive 178 may be controlled such that the bowl can be lowered but cannot be raised. Similarly, if the switch 136 becomes opened during lifting or mixing operations, the control circuit 170 may disable the mixing drive 11, bowl up/down drive 178 and/or the bowl up/down switch 176 to stop any lifting or mixing operations. If the sensor 130 becomes opened during mixing operations, besides disabling the mixing drive 11, the control circuit may trigger the annunciator 180 to attract the attention of the operator.

Figure 17:
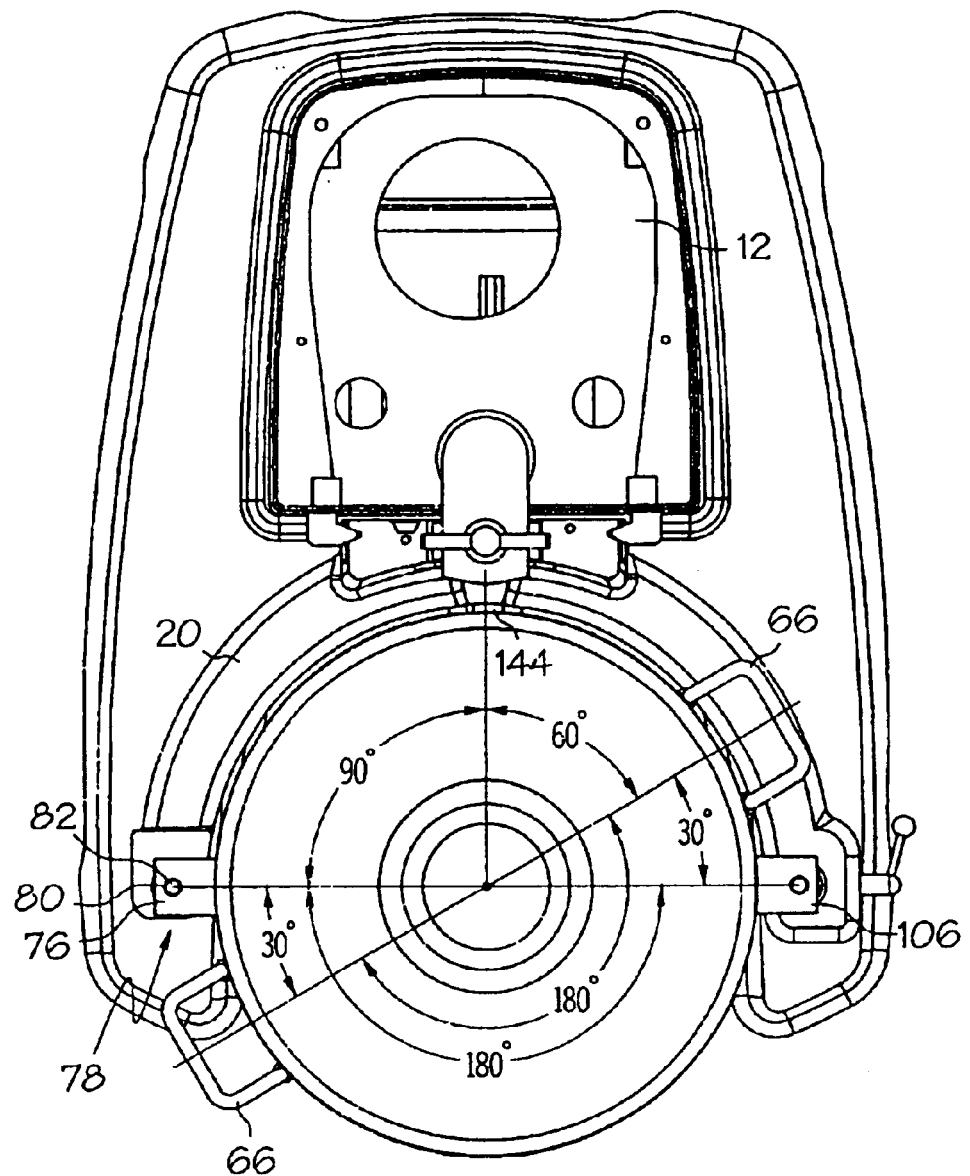
FIG. 17 is a top view of the mixer of FIG. 9.

The location and orientation of the various components of the bowl 102 maybe varied to conform the bowl to various mixers. However, FIG. 17 illustrates one embodiment of the bowl 102. In the illustrated embodiment, the handles 66 are about 180 degrees apart from each other. Similarly, the locking bracket 106 and the mounting brackets 76, 78 are about 180 degrees apart from each other. The mounting brackets 76, 78 are spaced about 30 degrees from the adjacent handle 66, and the protrusion 144 is spaced about 90 degrees from the locking brackets 76, 78 and locking bracket 106.

Having described the invention in detail and by reference to the preferred embodiments, it will be apparent that modifications and variations thereof are possible without departing from the scope of the invention.

What is claimed is:

1. A mixer system comprising:
   a bowl for receiving a material to be mixed, said bowl including a protruding part; and
   a mixer body having a rotatable output component extending downward toward a bowl-receiving yoke shaped to receive said bowl therein, a hinge about which the bowl is pivotable between a loading/unloading position and a closed position relative to said yoke, a downwardly retractable locking pin coupled to said yoke and being shaped to be received in or located adjacent to said protruding part of said bowl when said bowl is in the closed position so as to prevent said bowl from pivoting relative to said yoke; and
   a manual locking pin actuator.

2. The mixer system of claim 1 wherein said manual locking pin actuator includes a handle extending from a side portion of said yoke.

3. The mixer system of claim 1 wherein the mixer body includes a sensor for detecting when the bowl is in the closed position, and wherein said hinge independently supports said bowl such that an orientation of an axis of said bowl relative to said mixer body remains substantially unchanged as the bowl is pivoted from the loading/unloading position toward said closed position.

4. A mixer system comprising:
   a bowl for receiving a material to be mixed, said bowl including a protruding part; and
   a mixer body having a rotatable output component extending downward toward a bowl-receiving yoke shaped to receive said bowl therein, a hinge about which the bowl is pivotable between a loading/unloading position and a closed position relative to said yoke, a downwardly retractable locking pin coupled to said yoke and being shaped to be received in or located adjacent to said protruding part of said bowl when said bowl is in the closed position so as to prevent said bowl from pivoting relative to said yoke; and
   a switch located on said mixer body for detecting when said bowl is in said closed position.

5. The mixer system of claim 4 further comprising an actuating assembly coupled to said mixer body and movable toward said switch, said bowl including a protrusion that engages said actuating assembly when said bowl is in the closed position to urge said actuating assembly into contact with said switch to cause said switch to be triggered.

6. The mixer system of claim 5 wherein said yoke is vertically movable along said mixer body and said switch is at a fixed vertical position, and wherein said actuating assembly includes a switch plate coupled to move with said yoke and extending generally vertically such that said switch plate can engage said switch during the entire range of vertical motion of said yoke relative to said mixer body.

7. The mixer system of claim 6 wherein said bowl includes an upper edge and wherein said protrusion is located adjacent to said upper edge.

8. The mixer system of claim 4 wherein the bowl-receiving yoke is mounted for up and down movement relative to the rotatable output component, a drive is provided to effect movement of the bowl-receiving yoke, and a control circuit is coupled with the switch and the drive, the control circuit prevents the drive from moving the bowl-receiving yoke upward when the switch indicates the bowl is not in the closed position.

9. The mixer system of claim 4 wherein the mixer body includes a drive for effecting movement of the rotatable output component, and a control circuit is coupled with the switch and the drive, the control circuit prevents the drive from moving the rotatable output component when the switch indicates the bowl is not in the closed position.

10. A mixer system comprising: a bowl for receiving a material to be mixed;
    a mixer body having a rotatable output component;
    a hinge, said bowl pivoting about said hinge relative to said mixer body when said bowl is moved between a loading/unloading position relative to said mixer body and a closed position relative to said mixer body;
    a sensor for detecting when said bowl is in said closed position;
    an actuating assembly coupled to said mixer body and wherein said sensor includes a switch coupled to said mixer body and said bowl includes a protrusion located on an outer surface thereof, and wherein when said bowl is in said closed position said protrusion engages said actuating assembly and urges said actuating assembly into contact with said switch to cause said switch to be triggered; and
    wherein said actuating assembly is vertically movable along said mixer body, said switch is in a fixed vertical position, and wherein said actuating assembly extends generally vertically such that said actuating assembly can engage said switch for the entire vertical range of motion of said actuating assembly relative to said mixer body.

11. A mixer system comprising:
    a bowl for receiving a material to be mixed;
    a mixer body having a rotatable output component;
    a hinge, said bowl pivoting about said hinge relative to said mixer body when said bowl is moved between a loading/unloading position relative to said mixer body and a closedposition relative to said mixer body; and
    a sensor for detecting when said bowl is in said closed position; and
    a drive for raising and lowering said bowl relative to said rotatable output component and a control unit receiving an output of said sensor and responsively preventing said bowl from being raised when said bowl is not in said closed position.

12. The mixer system of claim 11 further including a motor for driving the rotatable output component, and the control unit responsively prevents said motor from driving said rotatable output component when said bowl is not in said closed position.

13. A mixer system comprising:
    a bowl for receiving a material to be mixed;
    a mixer body having a rotatable output component;
    a hinge, said bowl pivoting about said hinge relative to said mixer body when said bowl is moved between a loading/unloading position relative to said mixer body and a closed position relative to said mixer body;
    a sensor for detecting when said bowl is in said closed position;
    wherein said hinge is formed by a combination of a portion of said bowl and a portion of said mixer body;

wherein said portion of said bowl comprises at least one bracket having at least one opening therein and said portion of said mixer body comprises at least one pin received in said opening of said bracket.

14. The mixer system of claim 13 wherein said hinge independently supports said bowl such that an orientation of an axis of said bowl relative to said mixer body remains substantially unchanged as the bowl is pivoted from the loading/unloading position toward said closed position, wherein the mixer body includes a drive for effecting movement of the rotatable output component, and a control circuit is coupled with the sensor and the drive, the control circuit prevents the drive from moving the rotatable output component when the sensor indicates the bowl is not in the closed position.

15. A mixer system comprising:
a bowl for receiving a material to be mixed and including a protruding part;
a mixer body having a rotatable output component, a yoke to receive said bowl, and a locking part;
a hinge supporting said bowl, said bowl pivoting about said hinge relative to said mixer body when said bowl is moved between a loading/unloading position relative to said yoke and a closed position adjacent to said yoke, where said protruding part contacts said locking part to hold said bowl in said closed position;
when said bowl is in said closed position said hinge is located on a side of said bowl that is opposite said protruding part and said locking part;
wherein said hinge independently supports said bowl such that an orientation of an axis of said bowl relative to said mixer body remains substantially unchanged as the bowl is pivoted from the loading/unloading position toward said closed position;
wherein said hinge is formed by engagement between at least a first part fixed to the bowl and at least a second part fixed to the yoke.

16. The mixer system of claim 15 wherein said bowl further includes a protrusion extending therefrom and positioned to extend toward said yoke when said bowl is in said closed position for activating a sensor on the mixer body.

17. The mixer system of claim 16 wherein the mixer body includes a drive for effecting movement of the rotatable output component, and a control circuit is coupled with the sensor and the drive, the control circuit prevents the drive from moving the rotatable output component when the sensor indicates the bowl is not in the closed position.

18. The mixer system of claim 15 wherein said locking part comprises a movable member.

19. A mixer system comprising:
a bowl body defining a space for receiving a material to be mixed and having an outer surface with at least one bowl hinge component fixed thereon;
a mixer body having a rotatable output component and at least one body hinge component fixed thereon;
wherein the bowl hinge component and the body hinge component engage each other to form a hinge about which said bowl body pivots relative to said mixer body to move between a loading/unloading position relative to said mixer body and a closed position relative to said mixer body;
wherein said hinge independently supports said bowl body such that an orientation of an axis of said bowl body relative to said mixer body remains substantially unchanged as the bowl body is pivoted from the loading/unloading position toward said closed position;
wherein the bowl hinge component rests on the body hinge component such that movement of the bowl hinge component vertically upward and away from the body hinge component disengages the two components.

20. The mixer system of claim 19 wherein the mixer body includes a sensor for detecting when the bowl body is in the closed position.

21. A mixer system comprising:
a bowl for receiving a material to be mixed and having at least one associated bowl hinge component that is fixed to the bowl;
a mixer body having a rotatable output component and at least one body hinge component thereon;
wherein the bowl hinge component and the body hinge component engage each other to form a hinge about which said bowl pivots relative to said mixer body to move between a loading/unloading position relative to said mixer body and a closed position relative to said mixer body;
wherein said hinge independently supports said bowl such that an orientation of an axis of said bowl relative to said mixer body remains substantially unchanged as the bowl is pivoted from the loading/unloading position toward said closed position; and
wherein the bowl hinge component rests on the body hinge component such that movement of the bowl hinge component vertically upward and away from the body hinge component disengages the two components.

22. The mixer system of claim 21 wherein the body hinge component is fixed to the mixer body.

23. The mixer system of claim 21 wherein the mixer body includes a sensor for detecting when the bowl is in the closed position.

24. A mixer for receiving a pivotable mixer bowl, comprising:
a mixer body having a motor for driving a downwardly extending output component;
a yoke mounted for vertical movement along the mixer body;
a pin;
an auxiliary pin, said pin and said auxiliary pin both being mounted onto said yoke, one spaced above the other such that an axis of said pin and an axis of said auxiliary pin are generally aligned and upright to define an upright bowl pivot axis.

25. The mixer of claim 24 wherein the mixer body includes a sensor for detecting a bowl closed position.

26. A mixer for receiving a pivotable mixer bowl, comprising:
a mixer body having a rotatable output component extending downward toward a bowl-receiving yoke, a hinge component located on said yoke and having an upright axis, a downwardly retractable bowl locking pin coupled to said yoke and spaced from the hinge component; and
a manual bowl locking pin actuator for retracting the bowl locking pin.

27. The mixer of claim 26 wherein the mixer body includes a sensor for detecting a bowl closed position.

28. A mixer for receiving a pivotable mixer bowl, comprising:
a mixer body having a rotatable output component extending downward toward a bowl-receiving yoke, a hinge component located on said yoke and having an upright axis, a downwardly retractable bowl locking pin coupled to said yoke and spaced from the hinge component; and a switch located on said mixer body and having a bowl closed position and a bowl open position.

29. The mixer of claim 28 further including a switch actuating assembly for contacting said switch.

30. The mixer of claim 29 wherein said yoke is movable vertically along said mixer body and said switch actuating assembly moves with said yoke.

31. A mixer for receiving a pivotable mixer bowl, comprising:

a mixer body having a downwardly extending rotatable output component;

a hinge component on a movable yoke of said mixer body, the hinge component at least in part defining an upright bowl pivot axis;

a sensor for detecting a bowl closed condition;

a drive for raising and lowering said yoke relative to said rotatable output component; and a control unit operatively connected with said sensor and responsively preventing said yoke from being raised by said drive in the absence of detection of said bowl closed condition.

32. The mixer of claim 31 wherein said hinge component comprises at least one upwardly extending pin fixed to said yoke.

33. The mixer of claim 31 further including a bowl locking mechanism on said yoke.

34. A mixer for receiving a pivotable mixer bowl, system comprising:

a mixer body having a downwardly extending rotatable output component;

a hinge component on said mixer body and at least in part defining an upright bowl pivot axis; and a control unit, including an associated sensor for detecting a bowl closed condition and a bowl open condition, the control unit responsive to disable a mixer function upon detection of the bowl open condition, the control unit responsive to enable the mixer function upon detection of the bowl closed condition.

35. The mixer of claim 34 wherein said hinge component comprises at least one upwardly extending pin fixed to said yoke.

36. The mixer of claim 34 further including a bowl locking mechanism on said yoke.

* * * * *